United States Patent
Kawahara

(10) Patent No.: US 7,433,288 B2
(45) Date of Patent: Oct. 7, 2008

(54) RECORDING DEVICE AND METHOD, RECORDING MEDIUM AND PROGRAM

(75) Inventor: Minoru Kawahara, Kanagawa (JP)

(73) Assignee: Sony Corporation (JP)

( * ) Notice: Subject to any disclaimer, the term of this patent is extended or adjusted under 35 U.S.C. 154(b) by 332 days.

(21) Appl. No.: 10/813,174

(22) Filed: Mar. 31, 2004

(65) Prior Publication Data

US 2004/0233806 A1 Nov. 25, 2004

(30) Foreign Application Priority Data

Apr. 4, 2003 (JP) ............. P2003-101583

(51) Int. Cl.
*G11B 27/36* (2006.01)

(52) U.S. Cl. ............. 369/59.13; 369/47.24; 369/47.33; 360/31

(58) Field of Classification Search ............. None
See application file for complete search history.

(56) References Cited

U.S. PATENT DOCUMENTS

| | | | | |
|---|---|---|---|---|
| 6,937,549 | B2 * | 8/2005 | Nozaki | 369/53.1 |
| 2003/0161233 | A1 * | 8/2003 | Sako et al. | 369/47.24 |
| 2004/0027942 | A1 * | 2/2004 | Sako | 369/47.12 |
| 2004/0233806 | A1 | 11/2004 | Kawahara | |

FOREIGN PATENT DOCUMENTS

| | | |
|---|---|---|
| JP | 11-136631 | 5/1999 |
| JP | 11-273265 | 10/1999 |
| JP | 2000-268511 | 9/2000 |

OTHER PUBLICATIONS

Japanese Office Action; Application No. 2003-101583; dated Jul. 12, 2006.

* cited by examiner

*Primary Examiner*—Joseph Feild
*Assistant Examiner*—Parul Gupta
(74) *Attorney, Agent, or Firm*—Rader Fishman & Grauer PLLC; Ronald P. Kananen

(57) ABSTRACT

High bit-rate data and low bit-rate data for the same material are recorded in time division. Meanwhile, the recorded low bit-rate data is read out so as to be used for verification or time-shift playback. In a time-shift playback process, a plurality of tags, each tag containing low-resolution data, is read out at a time so that the read out low-resolution data are played back within excessive time generated by successively recording a plurality of cartons. For example, five cartons corresponding to an input video signal for 10 seconds are successively recorded. Within the resulting excessive time of 1.6 (=5×0.32) seconds, five tag are successively read out so as to play back the low-resolution data for the reproduction time of 10 seconds. The present invention is applicable to a disc recorder.

18 Claims, 22 Drawing Sheets

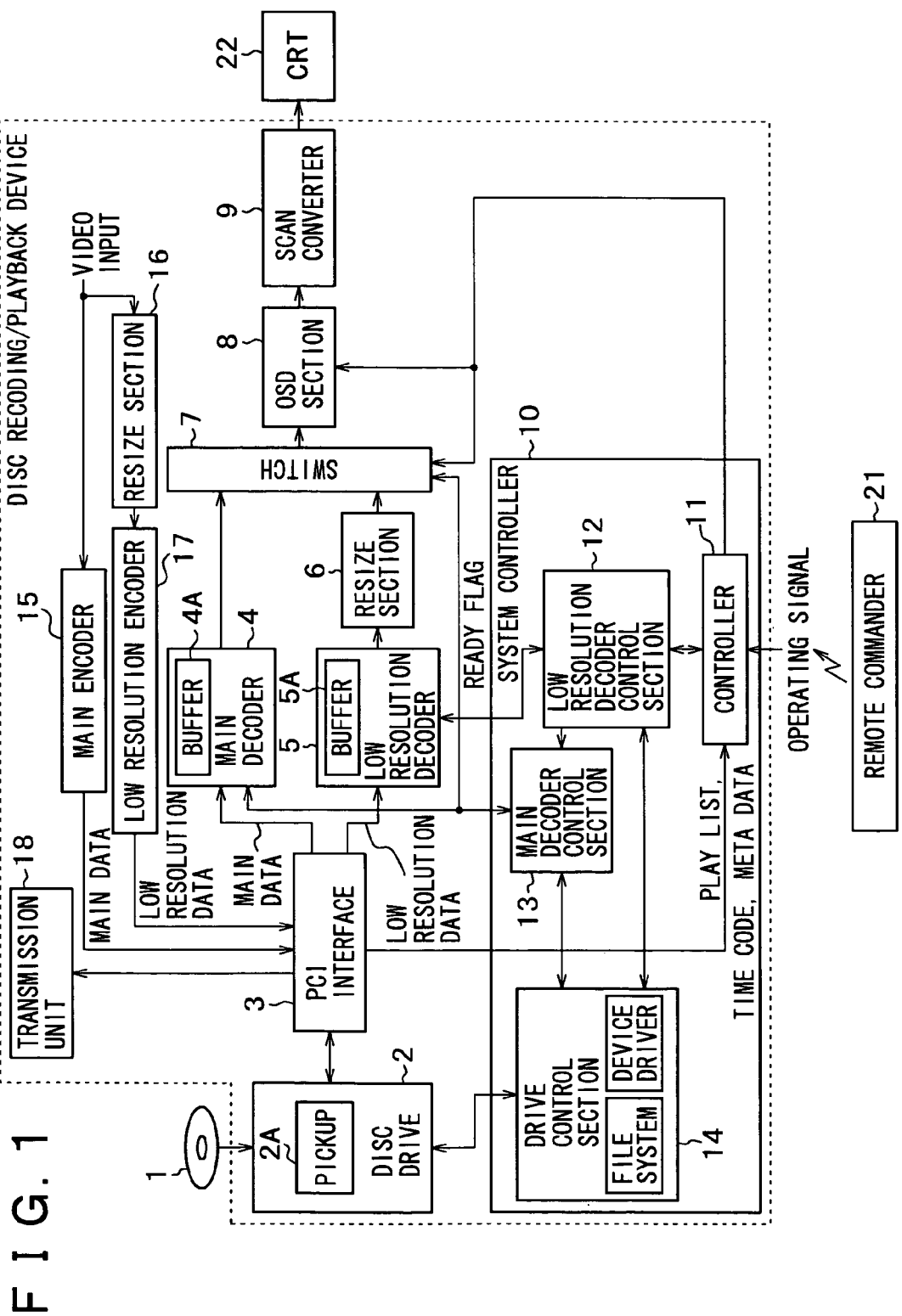

F I G. 3
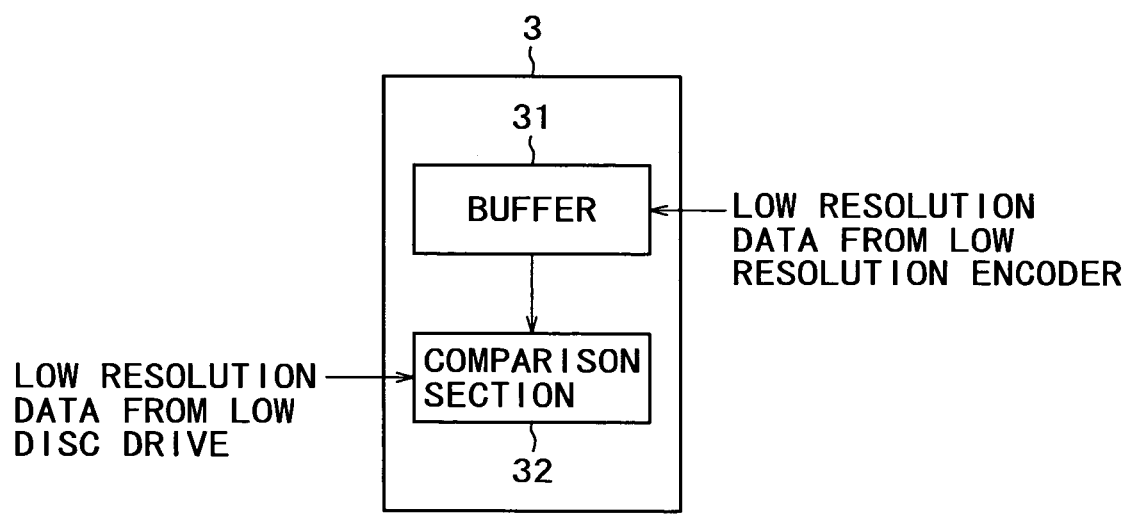

F I G. 9
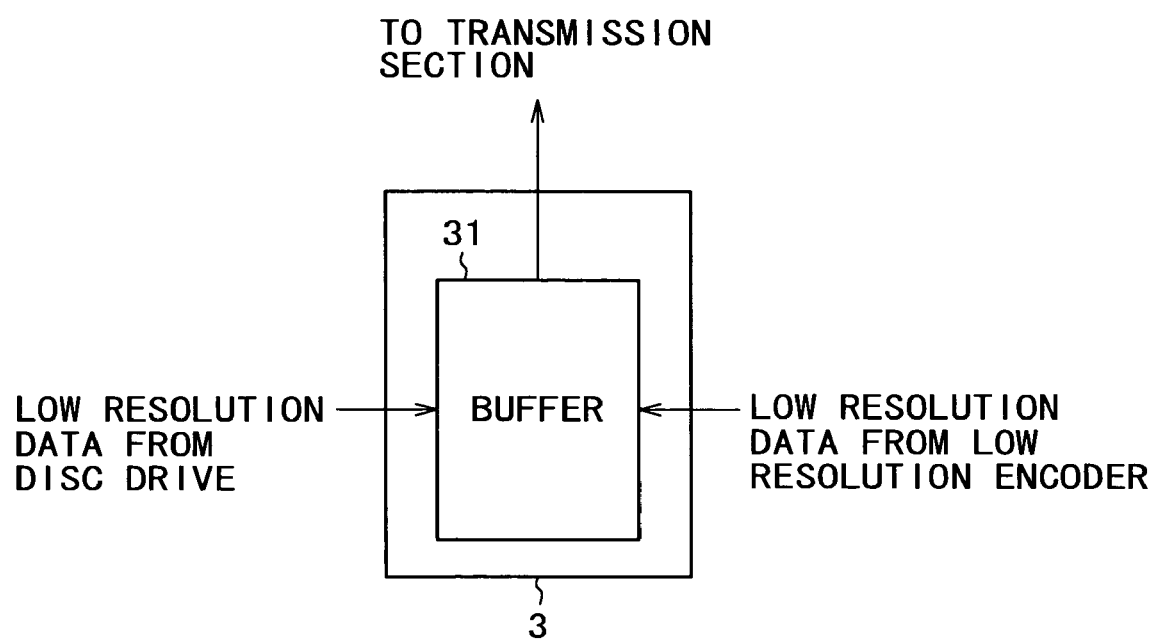

F I G. 1 3
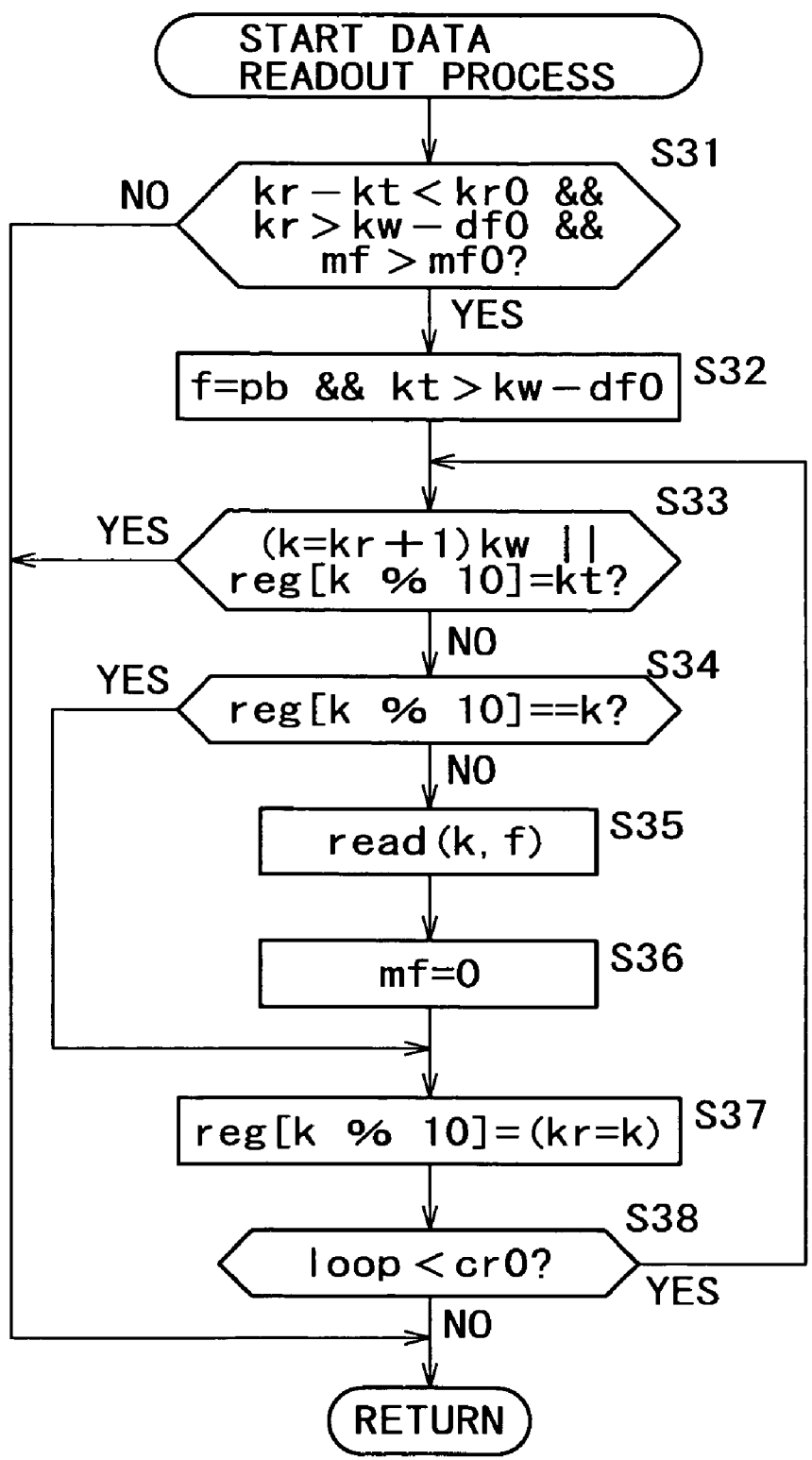

F I G. 1 5

| MODE | mf0 | kr0 | COMMENTS |
|---|---|---|---|
| LOW SPEED ≦ 128kbps | 15 | 3 | READ AT INTERVAL OF 30 SECONDS OR MORE |
| MIDDLE SPEED, IMAGE PLAYBACK | 5 | 3 | READ NOT FREQUENTLY |
| HIGH SPEED ≦ 2Mbps | 1 | 5 | READ AS MUCH AS POSSIBLE |

F I G. 1 7
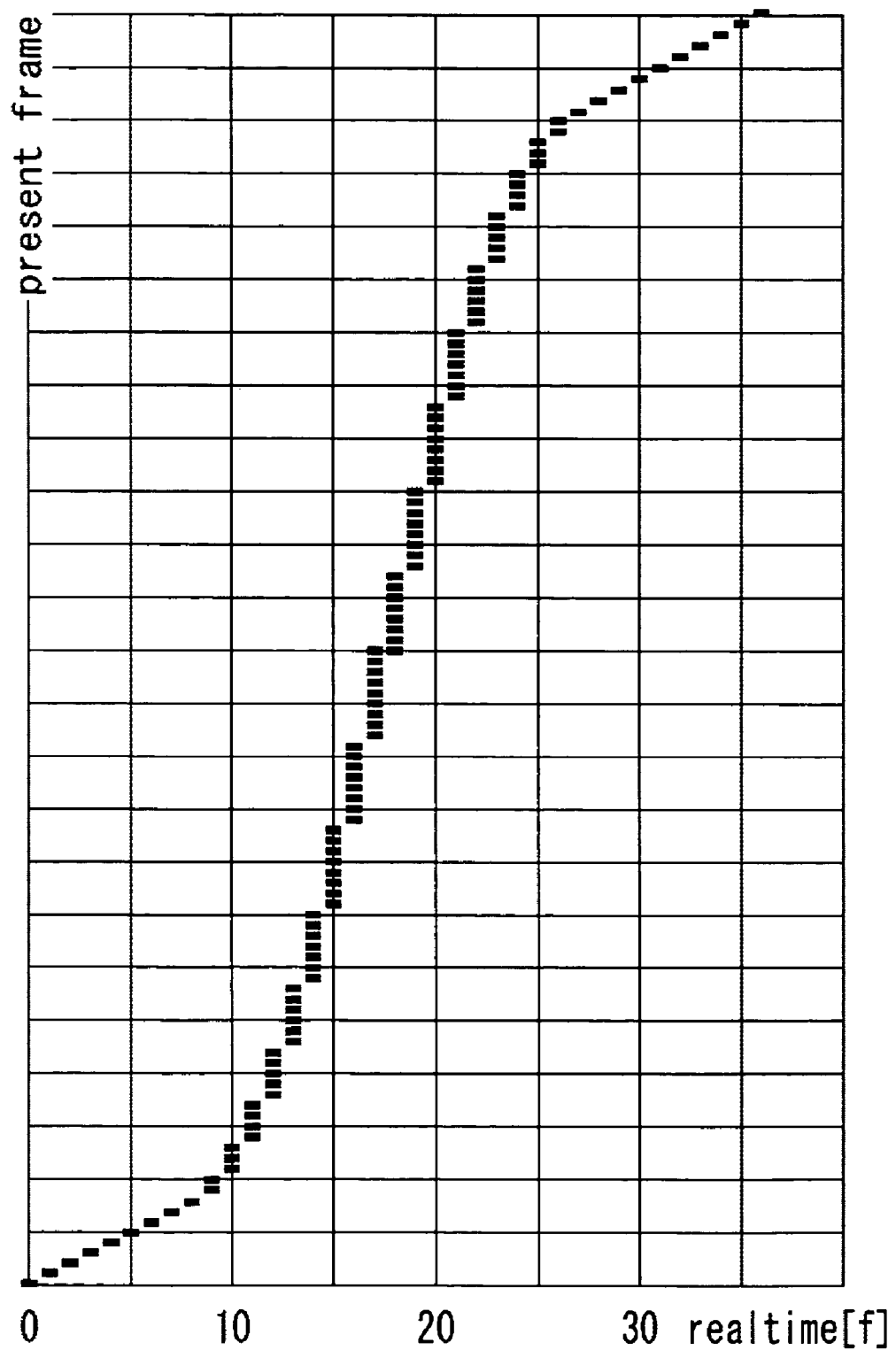

RECORDING DEVICE AND METHOD, RECORDING MEDIUM AND PROGRAM

CROSS REFERENCES TO RELATED APPLICATIONS

The present document is based on Japanese Priority Document JP 2003-101583, filed in the Japanese Patent Office on Apr. 4, 2004, the entire contents of which being incorporated herein by reference.

BACKGROUND OF THE INVENTION

1. Field of the Invention

The present invention relates to recording device and method, a recording medium and a program, for example, which are suitable for use to record first data at a high bit rate and second data at a lower bit rate than that of the first data, both data corresponding to the same material, on an information recording medium.

2. Description of Related Art

In recent years, information recording media, such as optical discs, with a remarkably improved recording rate have been put into practical use. On such information recording media, relatively high-quality video data can be recorded for long time.

The applicant of the present invention has already proposed a method of recording high-resolution video data and low-resolution video data for the same image contents on an optical disc so as to use the low-resolution video data for editing and the like (for example, see Patent Document 1 cited below).

[Patent Document 1]

Japanese Patent Application Publication Hei JP 11-136631

In the proposed method mentioned above, the high-resolution video data and the low-resolution video data are recorded on the optical disc. However, there is no proposal yet to read out the recorded high-resolution video data or low-resolution video data so as to use the read out data for any process while the recording is in progress.

SUMMARY OF THE INVENTION

In view of the above-described background, the present invention is devised to substantially simultaneously record high bit-rate data and low bit-rate data for the same material in time division while reading out the recorded low bit-rate data simultaneously with the recording so as to use the read out data for a verification process or time-shift playback.

A recording medium according to the present invention includes: first generation means for encoding input material data so as to generate first encoded data; second generation means for encoding the input material data so as to generate second encoded data; recording means for recording the first encoded data generated by the first generation means and the second encoded data generated by the second generation means on an information recording medium in an alternate manner in terms of time; and readout means for reading out the second encoded data recorded on the information recording medium while the recording means is recording any one of the first and second encoded data.

The recording device according to the present invention further includes: storage means for storing the second encoded data recorded on the information recording medium by the recording means; and comparison means for comparing the second encoded means read out by the readout means with the stored second encoded data.

The recording means can rewrite the encoded data stored by the storage means on the information recording medium in accordance with the result of comparison by the comparison means.

The recording means can rewrite the encoded data stored by the storage means in a separate unrecorded area on the information recording medium if a plurality of successive results of the comparison by the comparison means shows that the data are not identical.

The recording means can perform recording on the information recording medium by a CLV method.

The recording device according to the present invention can further include reproducing means for decoding and reproducing the second encoded data read out by the readout means.

A recording method according to the present invention includes: a first generation step of encoding input material data so as to generate first encoded data; a second generation step of encoding the input material data so as to generate second encoded data; a recording step of recording the first encoded data generated in the first generation step and the second encoded data generated in the second generation step on an information recording medium in an alternate manner in terms of time; and a readout step of reading out the second encoded data recorded on the information recording medium while any one of the first and second encoded data is being recorded in the recording step.

A program of a recording medium according to the present invention includes: a first generation step of encoding input material data so as to generate first encoded data; a second generation step of encoding the input material data so as to generate second encoded data; a recording step of recording said first encoded data generated in the first generation step and the second encoded data generated in the second generation step on the information recording medium in an alternate manner in terms of time; and a readout step of reading out the second encoded data recorded on the information recording medium while any one of the first and second encoded data is being recorded in the recording step.

A program according to the present invention makes a computer execute a process including: a first generation step of encoding input material data so as to generate first encoded data; a second generation step of encoding the input material data so as to generate second encoded data; a recording step of recording the first encoded data generated in the first generation step and the second encoded data generated in the second generation step on an information recording medium in an alternate manner in terms of time; and a readout step of reading out the second encoded data recorded on the information recording medium while any one of the first and second encoded data is being recorded in the recording step.

In the recording device and method and the program according to the present invention, input material data is encoded to generate first encoded data and second encoded data. The first encoded data and the second encoded data are alternately recorded on an information recording medium in terms of time. Furthermore, the second encoded data recorded on the information recording medium is read out while the first and second encoded data are being recorded.

As described above, according to the present invention, high bit-rate data and low bit-rate data for the same material are substantially simultaneously recorded in time division. Simultaneously with the recording, the recorded low bit-rate data is read out so as to be used for verification or time-shift playback during the recording.

Moreover, once the low resolution data is recorded, the concealment is made possible. Furthermore, the reliability of time code and meta data is improved to lower the possibility that the main track data is recorded in a defective area of the information recording medium. Since the amount of low resolution data is smaller than that of the main track data, the low resolution data can be read out even if excessive time generated in the recording is short and even by a CLV method whose readout speed is lowered. Therefore, contents of the recorded part can be audio-visually confirmed as motion pictures while the recording is in progress. Moreover, the data of the recorded part is externally transmitted while the recording is in progress so that the transmitted data is used for proxy-edit. Furthermore, since it is not necessary to increase the number of revolutions of the optical disc for readout, the present invention is also advantageous in that any uncomfortable noises are not generated. Since data, which has been just recorded, and data read out later are arranged on the same memory space, both data can be treated in a similar manner, thereby simplifying a circuit. Even the low resolution data has a transmission speed lower than single speed in many cases. Therefore, if the transmission can be started simultaneously with the start of recording as in this embodiment, the total amount of time required for transmission of the low resolution data can be reduced.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 1 is a block diagram showing an exemplary configuration of a disc recording/reproducing device with the application of the present invention;

FIG. 3 is a block diagram showing an exemplary configuration of a PCI interface for a verification process;

FIG. 9 is a block diagram showing an exemplary configuration of a PCI interface for an upload process;

FIG. 13 is a flowchart for illustrating a data readout process at a step S17 in FIG. 11;

FIG. 15 is a diagram for illustrating set values of frequency limit and exhaustion limit in the upload process;

FIG. 16 is a diagram for schematically illustrating high-speed playback by a conventional DVD player or the like;

FIG. 17 is a diagram for schematically illustrating high-speed playback by the disc recording/reproducing device according to the embodiment of the present invention;

DESCRIPTION OF THE PREFERRED EMBODIMENT

Figure 2:
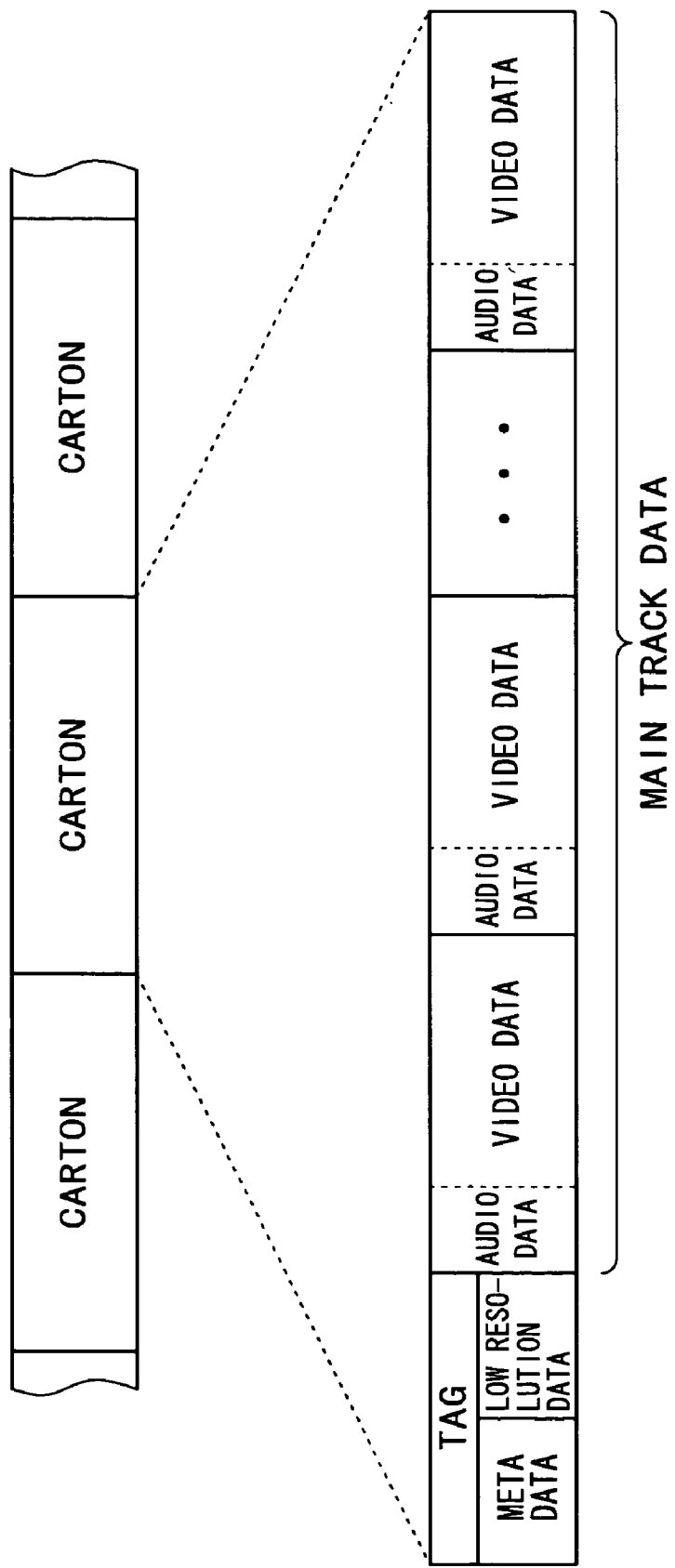
FIG. 2 is a diagram showing an example of a recording format of an optical disc.

Hereinafter, a preferred embodiment of the present invention will be described. In order to clarify the correlation between each means of the invention recited in the appended claims and the following embodiment, the features of the present invention will be described below in such a manner that each means is followed by a corresponding embodiment in parentheses (only one example for each means).

More specifically, a recording device according to the present invention (for example, a disc recording/reproducing device shown in FIG. 1) includes: first generation means (for example, a main encoder 15 in FIG. 1) for encoding input material data so as to generate first encoded data (for example, main track data); second generation means (for example, a low resolution encoder 17 shown in FIG. 1) for encoding the input material data so as to generate second encoded data (for example, low resolution data); recording means (for example, a process at a step S1 shown in FIG. 4 executed by a disc drive 2 in FIG. 1) for recording the first encoded data generated by the first generation means and the second encoded data generated by the second generation means on an information recording medium in an alternate manner in terms of time; and readout means (for example, a process at a step S3 shown in FIG. 4 executed by the disc drive 2 shown in FIG. 1) for reading out the second encoded data recorded on the information recording medium while the recording means is recording any one of the first and second encoded data.

The recording device according to the present invention further includes: storage means (for example, a buffer 31 in FIG. 3) for storing the second encoded data recorded on the information recording medium by the recording means; and comparison means (for example, a comparison section 32 in FIG. 3) for comparing the second encoded means read out by the readout means with the stored second encoded data.

The recording device according to the present invention can further include reproducing means (for example, a low resolution decoder 5 in FIG. 1) for playing back the second encoded data read out by the readout means.

FIG. 1 shows an exemplary configuration of a disc recording/reproducing device according to an embodiment to which the present invention is applied. The disc recording/reproducing device encodes an input video signal at two image qualities, that is, at a high or standard resolution and a lower resolution, by a predetermined encoding method. The resulting high bit-rate encoded data (at a high resolution or a standard resolution) and low bit-rate encoded data (at a low resolution) are recorded/played back on/from an optical disc 1.

The high bit-rate encoded data is decoded so as to be provided for a user in normal playback (normal reproduction). Hereinafter, the high bit-rate encoded data is also referred to as main track data. On the other hand, the low bit-rate encoded data is decoded so as to be provided for a user in, for example, high-speed playback (reproduction) or editing. Hereinafter, the low bit-rate encoded data is also referred to as low resolution data.

The optical disc 1 can be inserted into and removed from the disc drive 2. In accordance with control by a drive control section 14 of the system controller 10, the disc drive 2 records the main track data or the low resolution data supplied from a PCI (Peripheral Component Interconnect) interface 3 on the optical disc 1 inserted to the disc drive 2 with a built-in pickup 2A. The disc drive 2 also reads out the main track data or the low resolution data recorded on the optical disc 1 with the pickup 2A so as to supply it to the PCI interface 3.

The PCI interface 3 includes a buffer 31 (FIG. 3) therein, and acts as an interface between the disc drive 2 and one of a main decoder 4, a low resolution decoder 5, a main encoder 15 and a low resolution encoder 17.

For example, the PCI interface 3 supplies the main track data supplied from the disc drive 2 to the main decoder 4 while supplying the low resolution data similarly supplied from the disc drive 2 to the low resolution decoder 5. The PCI interface 3 also supplies the low resolution data supplied from the disc drive 2 to a transmission section 18.

The PCI interface 3 also acts as an interface between the disc drive 2 and the main encoder 15 or the low resolution encoder 17 so as to supply the main track data supplied from the main encoder 15 to the disc drive 2 while supplying the low resolution data supplied from the low resolution encoder 17 to the disc drive 2.

In this embodiment, a play list produced by non-destructive editing or the like can also be recorded on the optical disc 1. If the play list is recorded on the optical disc 1, the play list is read out from the optical disc 1 by the disc drive 2. Then, the readout play list is supplied to a controller 11 through the PCI interface 3. Furthermore, as described below, meta data or a time code is also recorded on the optical disc 1. The meta data or the time code is read out from the optical disc 1 by the disc drive 2 so as to be supplied to the controller 11 through the PCI interface 3.

The main decoder 4 includes a buffer 4A in which the main track data supplied from the PCI interface 3 is temporarily stored. The main decoder 4 performs, for example, MPEG-decoding on the main track data stored in the buffer 4A in accordance with the control of a main decoder control section 13 of the system controller 10. Then, the main decoder 4 supplies the resulting high-resolution or standard-resolution video data (hereinafter, also referred to as main track video data) to a switch 7. The main decoder 4 also supplies a ready flag, which indicates a ready state of an output of video data obtained by decoding the main track data supplied from the PCI interface 3, to the switch 7 and the main decoder control section 13.

In this case, the ready flag is, for example, a 1-bit flag. If the output of video data by the main decoder 4 is ready, the value of the ready flag is set to, for example, 1. If not, the value of the ready flag is set to, for example, 0.

The ready flag indicates an output preparation state of the main track data in a broad manner. Therefore, it is apparent that a state where the main decoder 3 is decoding a picture instead of decoding another picture that should be decoded is included in the output preparation state. In addition, a state where an error occurs in the main track data to prevent a picture from being decoded is also included in the output preparation state.

The low resolution decoder 5 includes a buffer 5A in which the low resolution data supplied from the PCI interface 3 is temporarily stored. Then, the low resolution decoder 5 decodes the low resolution data stored in the buffer 5A by a predetermined method in accordance with the control of a low resolution decoder control section 12 of the system controller 10. Then, the low resolution decoder 5 supplies the resulting video data at a low resolution (hereinafter, also referred to as low resolution video data) to a resize section 6.

The resize section 6 is configured with poly-phase filters at, for example, 5:2 (3:1 in a case of PAL (Phase Alternation by Line) by 11:4. The resize section 6 thins out horizontal lines of the low resolution data corresponding to progressive video data, in which one frame is composed of 30 horizontal lines, so as to generate interleaved video data, in which one frame is composed of 60 horizontal lines. Furthermore, the resize section 6 interpolates pixels of the video data and the like so as to generate video data having the same size (the same number of pixels) as that of the main track video data output from the main decoder 4 (hereinafter, also referred to as resized video data). Then, the resize section 6 supplies the thus generated video data to the switch 7.

The switch 7 selects one of the main track video data output from the main decoder 4 and the resized video data output from the resize section 6 in accordance with the ready flag supplied from the main decoder 4 so as to output the selected one to the OSD (On Screen Display) section 8. The switch 7 also selects one of the main track video data output from the main decoder 4 and the resized video data output from the resize section 6 in accordance with the control from the controller 11 so as to supply the selected one to the OSD section 8. Therefore, in the embodiment shown in FIG. 1, the selection of one of the main track video data and the resized video data to be output by the switch 7 can be made not only by the ready flag but also by the control from the controller 11.

The OSD section 8 superimposes information such as a time code on the video data supplied from the switch 7 as needed so as to supply it to a scan converter 9. The scan converter 9 converts a scanning method of the video data supplied from the OSD section 8 as needed so as to supply it to a display 22. The OSD section 8 includes a buffer for storing the video data supplied from the switch 7. In high-speed playback, the OSD section 8 combines a plurality of video data obtained by decoding the low resolution data supplied from the switch 7 in accordance with the control from the system controller 10 so as to output the combined video data to a later stage. A process in the high-speed playback will be described below with reference to FIG. 16 and the subsequent drawings.

The controller 11; the low resolution control section 12; the main decoder control section 13; and a drive control section 14 constitute the system controller 10. The system controller 10 controls each of the blocks constituting the device.

More specifically, the controller 11 receives an operating signal supplied by manipulation of a remote commander (or a remote controller) 21 by a user, and the play list, the time code or the meta data supplied from the PCI interface 3 so as to control the switch 7 or the low resolution decoder control section 12 in accordance with the operation signal, the play list, the time code, the meta data or the like.

The low resolution decoder control section 12 controls the low resolution decoder 5 and the drive control section 14 in accordance with the control from the controller 11.

The main decoder control section 13 monitors the control on the low resolution decoder 5 by the low resolution decoder control section 12 and controls the main decoder 4 and the drive control section 14 so as to follow the control.

The drive control section 14 is configured with, for example, a file system and a device driver. The drive control section 14 controls the disc drive 2 in accordance with the control from the low resolution decoder control section 12 and the main decoder control section 13.

The main encoder 15 encodes video data, which is input so as to be recorded, at a predetermined high bit rate by an MPEG-encoding method or the like. Then, the main encoder 15 outputs the resulting main track data to the PCI interface 3. A resize section 16 performs a reverse process to that performed by the resize section 6 on the video data which is input so as to be recorded. The resize section 16 outputs the resulting progressive video data, in which one frame is composed of 30 horizontal lines, to the low resolution encoder 17. The low resolution encoder 17 encodes the video data input from the resize section 16 by a JPEG (Joint Photographic Coding Experts Group) encoding method or the like at a predetermined bit rate lower than the bit rate of encoding by the main encoder 15. Then, the low resolution encoder 17 outputs the resulting low resolution data to the PCI interface 3.

The remote commander 21 outputs, for example, an infrared ray operating signal in accordance with a manipulation by a user. The display 22 displays the video data supplied from the scan converter 9.

In the embodiment shown in FIG. 1, for example, the system controller 10 can be configured with a software, whereas the blocks other than the system controller 10 can be configured with dedicated hardwares, respectively. Moreover, for example, the main decoder 4, the low resolution decoder 5, the resize section 6, the switch 7, the main encoder 15, the resize section 16, the low resolution encoder 17 and the like can be configured by making a DSP (Digital Signal Processor) or the like execute a program. Furthermore, the system controller 10 may be configured with a dedicated hardware instead of a software.

In the disc recording/reproducing device shown in FIG. 1, the recording or reproducing is performed on the optical disc 1. However, information recording media other than the optical disc, for example, a magnetic disk, a magneto-optical disc or a magnetic tape may also be used for recording or reproducing of data.

Next, FIG. 2 shows a recording format of the optical disc 1.

The optical disc 1 is, for example, a CLV (Constant Linear Velocity) system optical disc. A track of the optical disc 1 is divided into a plurality of sectors. Furthermore, a cluster corresponding to a unit of reading/writing data from/on the optical disc 1 is composed of at least one sector. In this case, the cluster can be composed of, for example, a 64-kilobyte recording area or the like.

As described above, the main track data and the low resolution data corresponding to the main track data are recorded on the optical disc 1. The main track data and the low resolution data are intermittently recorded in units of a predetermined amount of time, for example, 1.5 to 2 seconds, of the original video data (video data before being encoded) or in units of a predetermined amount of the original data.

More specifically, assuming that a predetermined unit containing the main track data and the low resolution data for a predetermined period of time of the original video data or a predetermined amount of the original video data is referred to as a carton, the main track data and the low resolution data are recorded for each carton on the optical disc 1 as shown in FIG. 2. In consideration of data recording on the CLV system optical disc 1, high-speed playback (so-called shuttle playback), data concealment, eject time of the optical disc 1 and the like, it is suitable that the main track data to be contained in each carton corresponds to, for example, 1.5 to 2 seconds of the original video data, as described above.

The carton is composed of, for example, as shown in FIG. 2, the low resolution data and the main track data, which are consecutively arranged. Therefore, the contents of the low resolution video data obtained by decoding the low resolution data arranged in a carton are the same as those of the main track video data obtained by decoding the main track data in the same carton except for their resolutions.

Besides the video data, the main track data can contain audio data associated with the video data. If the main track data contains both the video data and the audio data, for example, as shown in FIG. 2, the video data for a predetermined amount of data or a predetermined period of reproduction time and the audio data associated with the video data are arranged in combination.

As the video data contained in the main track data in this case, for example, video data at a bit rate of 25 Mbps (Mega bits per second), in which one GOP (Group of Pictures) is formed by 15 frames, can be used. As the audio data contained in the main track data in this case, for example, 4-channel audio data at a total bit rate of 3 Mbps, which is 16-bit quantized at a sampling rate of 48 kHz, can be used. Furthermore, as the low resolution data, for example, data obtained by JPEG-encoding video data of 256 by 192 pixels can be used.

If the low resolution data is obtained by JPEG-encoding video data as described above, the low resolution decoder 5 shown in FIG. 1 is configured with a JPEG decoder for JPEG decoding.

In addition to the low resolution data and the main track data, the time code of the video data, which is obtained by decoding the low resolution data and the main track data, and the meta data in which predetermined information is arranged, and the like can be contained in the carton. In the meta data, it is possible to provide not only arbitrary information for a user but also a recording start position of the main track data in the carton and the information for the structure of GOP of the video data contained in the main track data. In the example shown in FIG. 2, the time code and the meta data are arranged together with the low resolution data. More specifically, assuming that a combination of the low resolution data, the time code and the meta data is referred to as a tag, the tag is situated at the head of the carton (the position on the optical disc 1, which is first read out) followed by the main track data. Therefore, in a case where the carton recorded on the optical disc 1 is to be read out, the tag is first read out followed by the main track data.

Assuming that the total bit rate of the meta data such as the time code as described above and the low resolution data is 2 Mbps, the bit rate of the data recorded on the optical disc 1 in units of carton shown in FIG. 2 is 30 (=25+3+2) Mbps. Therefore, an optical disc having a recording rate of, for example, 35 Mbps or the like, which recording rate satisfactorily falls within the range of practical use, can be used as the optical disc 1. It is apparent that the disc drive 2 has a performance of recording data at a recording rate of 35 Mbps or higher.

The low resolution data is arranged at a position on the optical disc 1 separately from corresponding main track data. In addition, the low resolution data has a sufficiently low bit rate and a small amount of data as compared with the main track data. Therefore, since the low resolution data can be verified (verified if it is correctly recorded or not) when it is recorded on the optical disc 1, the low resolution data can be recorded with high reliability as compared with the main track data. The verification of the low resolution data will be described below with reference to FIGS. 3 to 6.

If the low resolution data is recorded, for example, after the video data is encoded by a fixed encoding method such as JPEG as described above, the contents recorded on the optical disc 1 can be easily confirmed regardless of the encoding method employed for the main track data. More specifically, in this case, a device capable of performing at least JPEG decoding can decode the low resolution data even if it cannot decode the main track data. Accordingly, the contents recorded on the optical disc 1 can be confirmed.

As described above, since not only the main track data but also the low resolution data corresponding to the video data of the main track data but having a smaller amount of data are recorded on the optical disc 1, the low resolution data can be read out together with the main track data from the optical disc 1. Therefore, for example, if an error occurs in the main track data, error concealment can be performed by using the low resolution data so as to prevent real time playback (real time reproduction) from being interrupted. Moreover, in a case where only the main track data is read out from the optical disc 1, the low resolution data having a smaller amount of data is immediately read out so as to be played back even if, for example, the main track data fails to be read out to be too late for real time playback. As a result, an interruption in the real time playback can be prevented.

Furthermore, for example, in a case where high-speed playback (so-called shuttle playback) whose reproduction speed is higher than a normal reproduction speed is performed, the low resolution data which can be advantageously decoded within a shorter period of time is used instead of the main track data that requires longer time for decoding. As a result, the number of images, which can be displayed in the high-speed playback, that is, the amount of information provided for a user can be increased.

As described above, the main track data may contain the audio data in addition to the video data in some cases. In this embodiment, however, the description of a process of the audio data is herein omitted for simplification of the description. Although a pattern is described as containing the entire main track data in the carton, an actual pattern has a fluctuation; for example, the main track video data corresponding to the low resolution data is sometimes recorded in the precedent or subsequent carton. Moreover, in the recording pattern on the actual disc, the data are not arranged with regularity as shown in FIG. 2 in some cases due to redundant data for demodulation or for error correction or for convenience of cluster control.

Next, the verification of the low resolution data, that is, the process for verifying if the low resolution data is correctly recorded in recording or not (hereinafter, also referred to as a verification process) will be described with reference to FIGS. 3 to 6.

FIG. 3 shows an exemplary inner configuration of the PCI interface 3 for the verification process. The buffer 31 temporarily stores the low resolution data input from the low resolution encoder 17, which is to be recorded on the optical disc 1. A comparison section 32 compares the low resolution data stored in the buffer 31 and the low resolution data recorded on the optical disc by the disc drive 2 so as to be immediately read out from the optical disc 1 by the disc drive 2 with each other to determine if they are identical with each other. If it is determined that these data are not identical with each other as a result of the comparison, the low resolution data stored in the buffer 31 is recorded on the optical disc 1 again.

Figure 4:
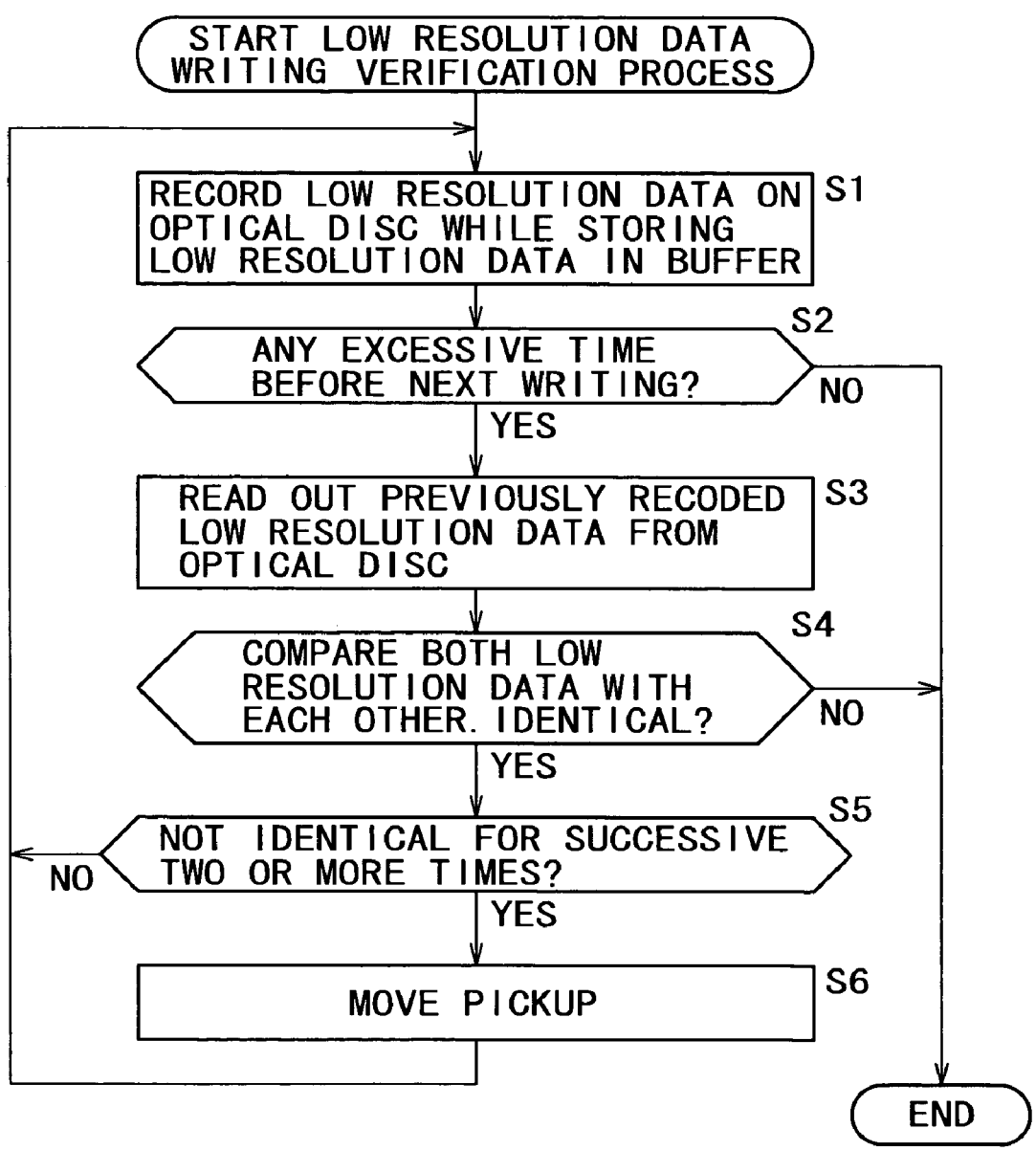
FIG. 4 is a flowchart for illustrating the verification process.

A procedure of the verification process is described with reference to a flowchart shown in FIG. 4. The verification process is executed each time the low resolution data is recorded on the optical disc 1.

At a step S1, the PCI interface 3 stores the low resolution data, which is input from the low resolution encoder 17 so as to be recorded on the optical disc 1, in the buffer 31 while supplying the same low resolution data to the disc drive 2. The disc drive 2 records the low resolution data supplied from the PCI interface 3 on the optical disc 1.

At a step S2, the system controller 10 determines whether there is excessive time before the start of writing next main track data or not. If it is determined that there is no excessive time before writing, that is, it is necessary to immediately write the next main track data, the verification process is terminated, expecting that the low resolution is recorded on the optical disc 1 without any abnormality.

On the other hand, if it is determined that there is excessive time before writing at the step S2, the process proceeds to a step S3. At the step S3, the disc drive 2 reads out the low resolution data written on the optical disc 1 by the process at the step S1 so as to supply it to the comparison section 32 of the PCI interface 3. Then, at a step S4, the comparison section 32 reads out the low resolution data stored in the buffer 31 and then compares the readout data with the low resolution data supplied from the disc drive 2 in the process at the step S3 so as to determine whether they are identical with each other or not. If it is determined that these data are identical with each other, the verification process is terminated because it means that the low resolution data is recorded on the optical disc 1 without any abnormality.

On the other hand, if it is determined that these data are not identical with each other at the step S4, the process proceeds to a step S5. At the step S5, the comparison section 32 determines whether or not the low resolution data has been determined as not being identical with the same low resolution data read out from the buffer 31 for successive two or more times in the process at the step S4. If it is determined that the low resolution data has not been determined as not being identical for successive two or more times, the process returns to the step S1 so as to rewrite the same low resolution data on the optical disc 1. Then, the subsequent processes are repeated.

If it is determined that the low resolution data has been determined as not being identical for successive two or more times at the step S5, the process proceeds to a step S6 because it is considered that a write error is caused by, for example, the presence of an area on the optical disc 1, on which data can be hardly recorded. At the step S6, the disc drive 2 moves the pickup 2A in a radial direction of the optical disc 1 so that subsequently recorded data is recorded on a recording area separate from the actual recording area on the optical disc 1. Thereafter, the process returns to the step S1 followed by the subsequent steps. The description of the procedure of the verification process has been made above.

By moving the pickup 2A as in the process at the step S6 described above, the subsequent main track data can be prevented from being written in the area that may be present on the optical disc 1, on which data can be hardly recorded. As a result, the reliability in writing the main track data can be improved.

Figure 5:
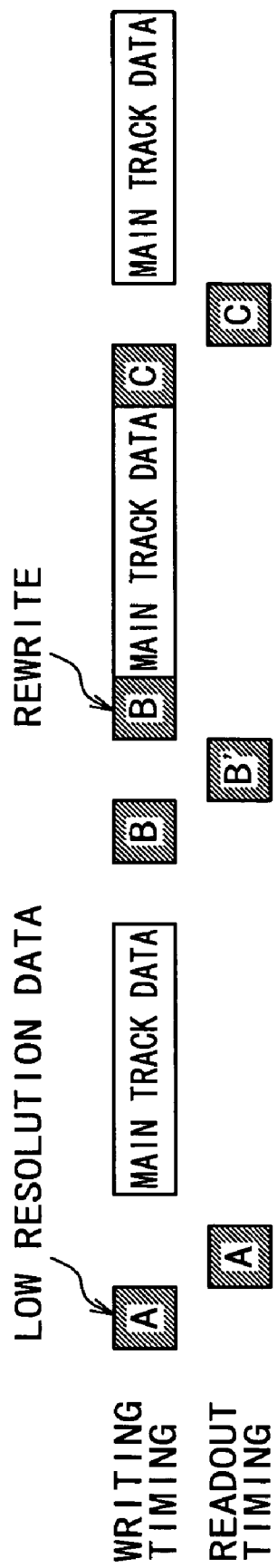
FIG. 5 is a diagram showing an example of the verification process in a case where the recording rate of a disc drive is single speed.

FIG. 5 shows a state where the above-described verification process is executed in a case where a recording rate of the disc drive 2 on the optical disc 1 is not sufficiently high with respect to the bit rate of the data (the main track data, the low resolution data and the like) to be recorded on the optical disc 1. In the illustrated case, each of the low resolution data A and C is successfully written at the first writing, whereas the low resolution data B is written twice because the first writing is failed. In this case, since it is necessary to record the next main track data immediately after the second writing of the low resolution data B, it is not certain if the low resolution data B is correctly written by the second writing.

Figure 6:
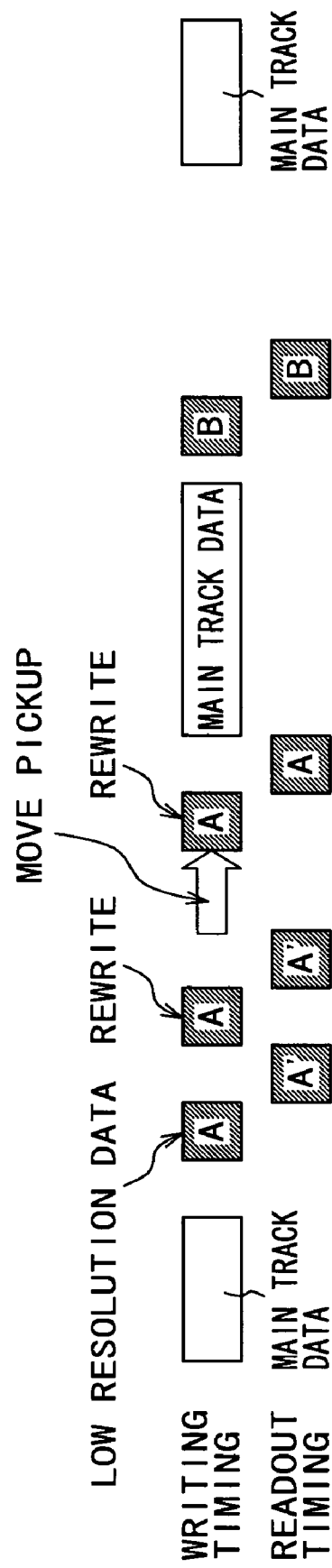
FIG. 6 is a diagram showing an example of the verification process in a case where the recording rate of the disc drive is double speed.

FIG. 6 shows a state where the above-described verification process is executed in a case where the recording rate of the disc drive 2 on the optical disc 1 is sufficiently high with respect to the bit rate of the data to be recorded on the optical disc 1. In the illustrated case, the low resolution data B is successfully written at the first writing, whereas the low resolution data A is successfully written at the third writing after the pickup 2A is moved because the first and second writings of the low resolution data A are failed.

Next, a process of playing back a recorded video signal while encoding an input video signal so as to record it on the optical disc 1 (hereinafter, referred to as a time-shift playback process) will be described.

As described above, the disc recording/reproducing device constituting the embodiment of the present invention encodes an input video signal at two types of resolution so that the resulting high bit-rate main track data and low bit-rate low resolution data are substantially simultaneously recorded on the optical disc 1. The bit rate of the carton containing the main track data and the low resolution data is 30 Mbps.

If the recording rate of the disc drive 2 is about 35 Mbps, an input video signal for two seconds is recorded every two seconds. However, since the actual time required to record the carton corresponding to the video signal for two seconds is only 1.68 seconds, excessive 0.32 seconds are generated every two seconds.

Figure 7:
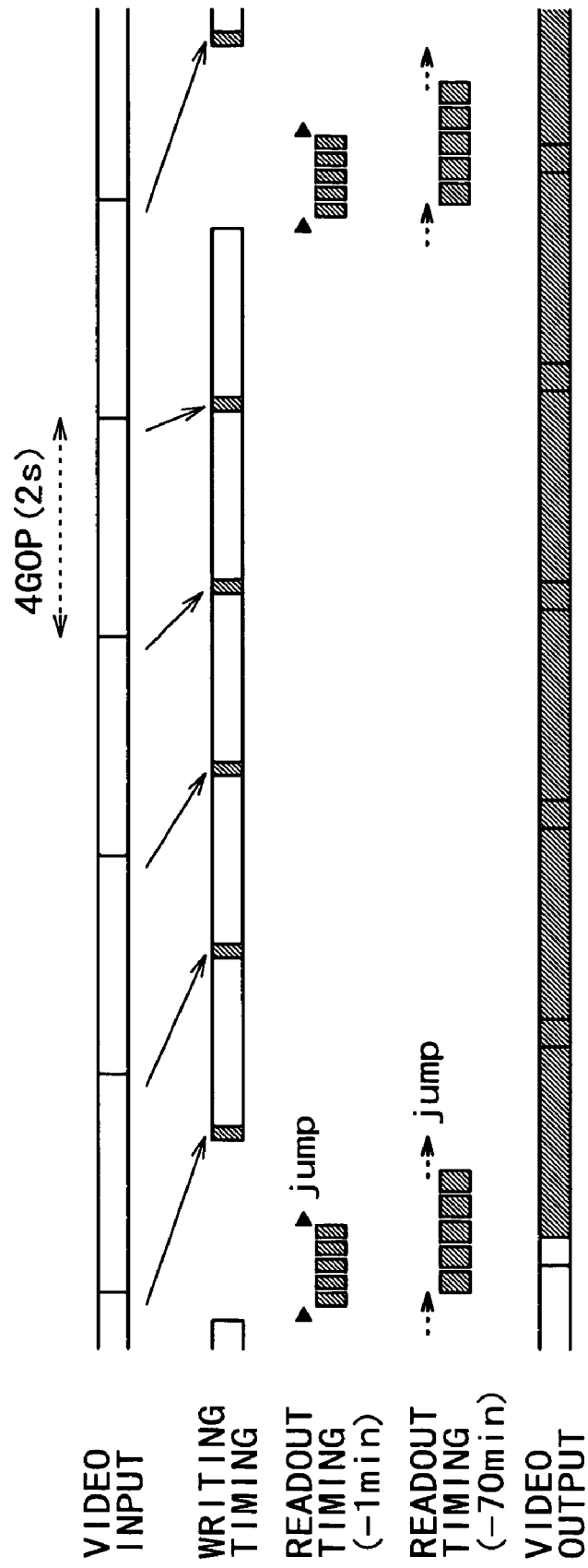
FIG. 7 is a diagram showing an example of time-shift playback in a case where the recording rate of the disc drive is single speed.

In this case, as shown in FIG. 7, a plurality of tags, each containing the low resolution data, are read out at a time so as to play back the readout low resolution data within excessive time generated by successively recording a plurality of cartons in the time-shift playback process. For example, five cartons corresponding to an input video signal for 10 seconds are successively recorded. Five tags are successively read out within the resulting excessive time of 1.6 (=5×0.32) seconds so as to play back the low resolution data for 10 seconds of reproduction time.

If a time difference between the time of the video signal being recorded and the reproduction time of a time-shift played back video signal (hereinafter, referred to as trace time) is short, the recording position and the readout position are close to each other. Therefore, few problems arise because the amount of movement of the pickup 2A for reading out the tag is small. In a case where the trace time is long, however, the recording position and the readout position are separate away from each other. Therefore, a moving distance of the pickup 2A for reading out the tag becomes long so that the movement of the pickup 2A takes a longer time. Accordingly, if a unit of 5 tags is read out at a time as shown in FIG. 7, the trace time is limited to about 70 seconds so that the time-shift playback is continuously performed without any interruptions.

Next, a case where a recording rate of the disc drive 2 is about 70 Mbps will be considered. Also in this case, an input video signal for two seconds is recorded every two seconds. However, since the actual amount of time required to record a carton corresponding to the video signal for two seconds is only 0.84 seconds, an excessive time of 1.16 seconds is generated every two seconds.

Figure 8:
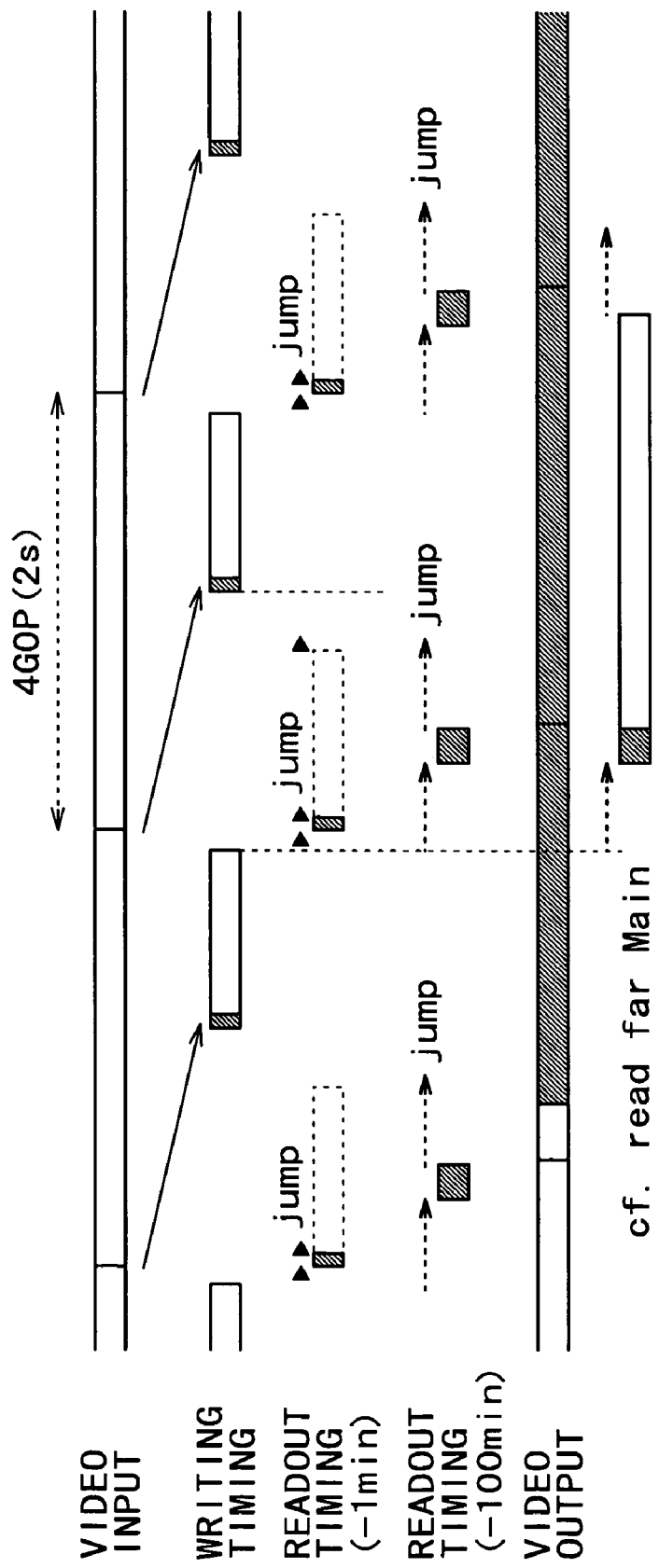
FIG. 8 is a diagram showing an example of time-shift playback in a case where the recording rate of the disc drive is double speed.

In this case, the tag containing the low resolution data is read out so as to play back the readout low resolution data in the time-shift playback within the excessive time of 1.16 seconds which is generated by recording one carton, as shown in FIG. 8. In a case where the excessive time is as long as 1.16 seconds as described above, there will be no problem if the amount of movement of the pickup 2A for reading out the tag becomes large. Therefore, even without limiting the trace time, for example, even if the trace time is set to be 100 seconds, the time-shift playback can be continuously performed without any interruptions.

Moreover, in a case where the excessive time is as long as 1.16 seconds as described above, only a small amount of movement of the pickup 2A is required to read out the tag if the trace time is short (for example, one second). Thus, the main track data may be read out so as to be played back instead of reading out the recorded tag. In such a case, an image provided for a user by the time-shift playback has high image quality.

Although the tag is read out after completion of recording in units of carton in the above description, the tag may be read out in response to a direction of time-shift playback given by a user even if the recording in units of carton is in progress. In such a manner, the quick-responsiveness to a user's operation can be enhanced.

A pair of the pickups 2A may be provided for the disc drive 2 so that both of them are enabled to read out data. As a result, in a case where the recording rate of the disc drive 2 is about 35 Mbps, it is no longer necessary to limit the trace time. In a case where the recording rate of the disc drive 2 is about 70 Mbps, the time-shift playback using the main track data can be constantly performed regardless of the trace time.

Next, a process of recording input video data on the optical disc 1 while externally transmitting the recorded video data through, for example, a LAN (Local Area Network) (hereinafter, this process is referred to as an upload process) will be described.

The upload process is in common with the above-described time-shift playback process in that the low resolution data is read out from the optical disc 1 within the excessive time generated after each recording of the carton containing the main track data and the low resolution data on the optical disc 1. In the time-shift playback process, however, the read out low resolution data is played back at single speed, that is, processed at a constant speed. On the other hand, in the upload process, the read out low resolution data is communicated through a predetermined network or the like. Therefore, unlike the time-shift playback process, the amount of time required to transmit a fixed amount of low resolution data is not necessarily fixed, depending on the busyness or congestion of the network and the like.

FIG. 9 shows an exemplary inner configuration of the PCI interface 3 for the upload process. The buffer 31 is used to temporarily store the low resolution data input from the low resolution encoder 17 so as to be recorded on the optical disc 1; and to store the low resolution data read out from the optical disc 1 by the disc drive 2 so as be transmitted by the transmission section 18. In the upload process, if the low resolution data to be transmitted is present in the buffer 31 for recording, the low resolution data is read out so as to be transmitted. On the other hand, if the low resolution data to be transmitted is not present in the buffer 31, the low resolution data to be transmitted is read out from the optical disc 1 so as to be stored in the buffer 31. Then, the low resolution data is read out from the buffer 31 so as to be transmitted.

Figure 10:
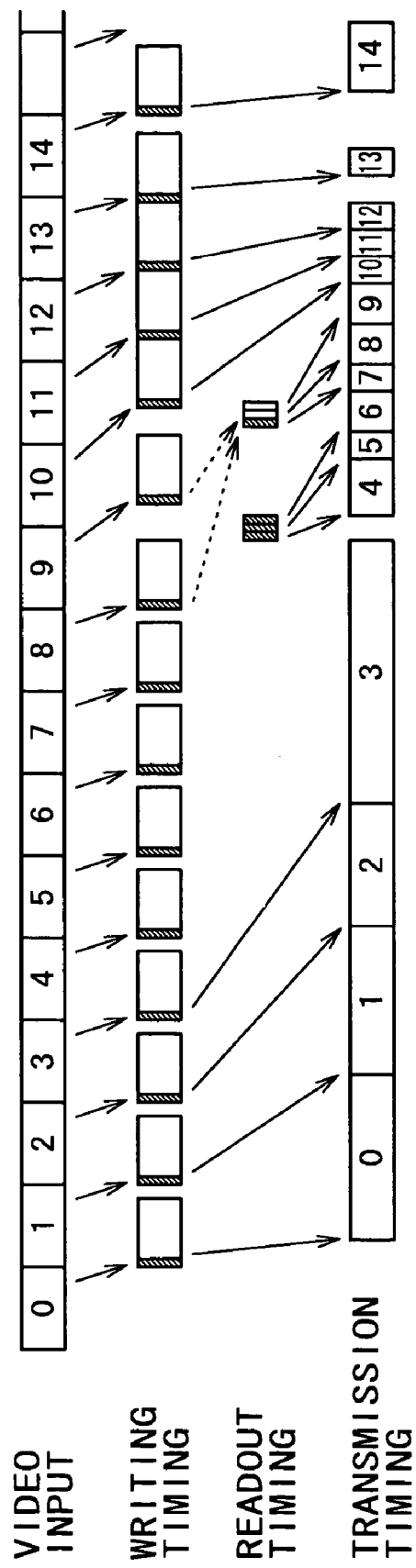
FIG. 10 is a diagram showing an example of the upload process.

FIG. 10 shows an example of the upload process, assuming that three low resolution data are successively read out from the optical disc 1 for each time.

In the illustrated case, since the 0th to third low resolution data to be transmitted are present in the buffer 31 at the time of transmission, these low resolution data are not read out from the optical disc 1 whereas the low resolution data present in the buffer 31 are transmitted. However, since the transmission speed of these low resolution data is low due to the status of the network or the like, the fourth low resolution data is no longer present in the buffer 31 when the fourth low resolution data is to be transmitted whereas the eighth to tenth low resolution data are stored therein. Accordingly, the fourth to sixth low resolution data are read out from the optical disc 1 to be stored in the buffer 31 for the transmission.

If the transmission speed of the fourth and all the low resolution data that follow is improved, up to the seventh low resolution data are read out from the optical disc 1. For the eighth and all the low resolution data that follow, however, the readout of these low resolution data from the optical disc 1 is omitted because the low resolution data stored in the buffer 31 for recording still remain at the time of transmission. Therefore, the low resolution data stored in the buffer 31 are used for transmission.

The upload process is realized by executing in parallel a writing process of writing the low resolution data on the optical disc 1 and a transmission process of externally transmitting the low resolution data. First, one of these processes, that is, the writing process will be described with reference to a flowchart shown in FIG. 11.

At a step S11, the PCI interface 3 sets an invalid value −1 to a register reg[ ], which indicates a carton number of data stored in the buffer 31 in the arrangement of the same size as that of the buffer 31, so as to clear the register. The PCI interface 3 sets a frequency limit value mf0 to a counter mf for limiting a readout frequency. Herein, the frequency limit value mf0 may be automatically set in accordance with a communication speed as shown in FIG. 15 or may be arbitrarily set by a user.

Moreover, at the step S11, the PCI interface 3 sets kr indicating a carton number of the last written data to +∞ and kw indicating the last readout data to 0.

At a step S12, the PCI interface 31 waits until data for one carton is stored in the buffer 31. After the data for one carton is stored in the buffer 31, the process proceeds to a step S13. At the step S13, the PCI interface 3 outputs the data for one carton stored in the buffer 31 to the disc drive 2. The disc drive 2 records the input data for one carton to the optical disc 1.

Figure 12:
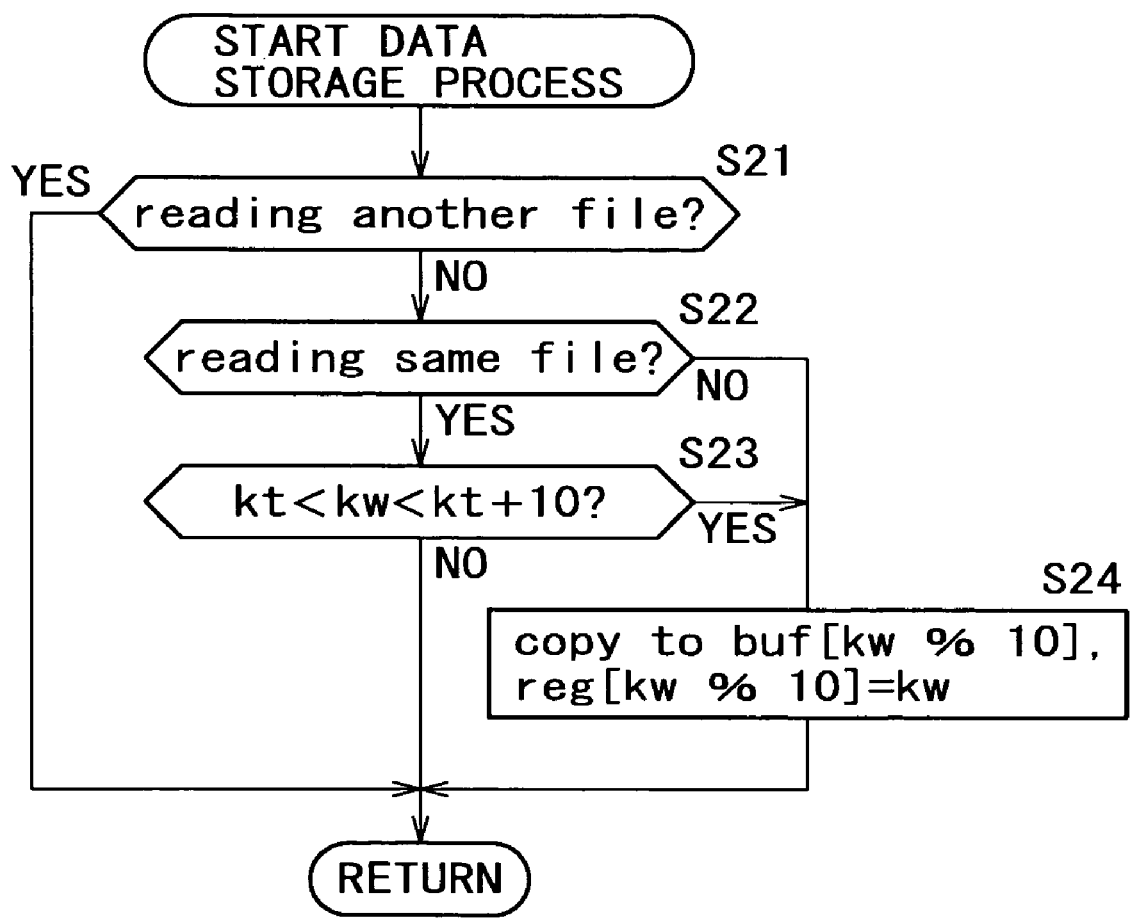
FIG. 12 is a flowchart for illustrating a data storage process at a step S14 in FIG. 11.

At a step S14, the PCI interface 3 determines whether the data for one carton which is stored in the buffer 31 is used shortly or not. If it is determined that the data is used shortly, the data for one carton is not erased but kept in the buffer 31. The process at the step S14 will be described with reference to a flowchart shown in FIG. 12.

At a step 21, it is determined whether data, which is different from that previously written on the optical disc 1 and still stored in the buffer 31, is read out or not. If it is determined that the different data is read out, the data stored in the buffer 31 is abandoned. Then, the process returns to a step S15 in FIG. 11.

If it is determined that the data different from the data stored in the buffer 31 is not read out at the step S21, the process proceeds to a step S22. At the step S22, it is determined whether the data still stored in the buffer 31 is read out or not. If it is determined that the data is read out, the process proceeds to a step S23. At the step S23, it is determined whether a conditional expression: kt<kw<kt+10 is satisfied or not. If it is determined that the conditional expression is satisfied, the process returns to the step S15 in FIG. 11. In this conditional expression, kt is the carton number of the data being transmitted.

If it is determined that the conditional expression: kt<kw<kt+10 is not satisfied at the step S23, the process proceeds to a step S24. At the step S24, the data still stored in the buffer 31 is further kept in the buffer 31, and kw is set to the register reg [kw %10]. The process returns to the step S15 in FIG. 11.

Figure 11:
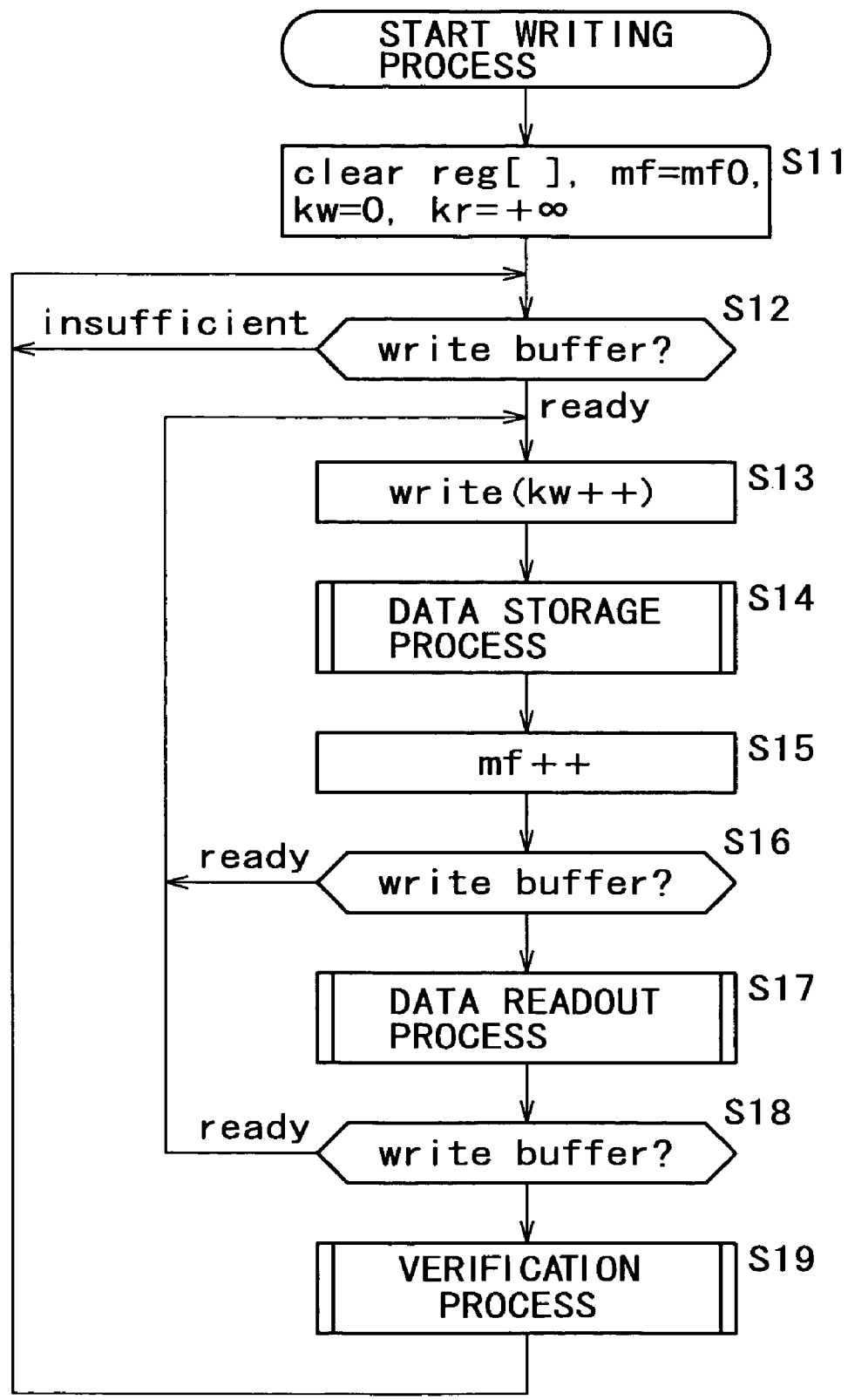
FIG. 11 is a flowchart for illustrating a writing process for realizing the upload process in combination with a transmission process.

At the step S15 in FIG. 11, the PCI interface 3 increments the count mf by 1. At a subsequent step S16, the PCI interface 3 determines whether the buffer 31 is void or not. After the determination, the process proceeds to a step S17. At the step S17, the data is duly read out from the optical disc 1. A process at the step S17 is described with reference to a flowchart shown in FIG. 13.

At a step S31, it is determined whether all conditional expressions: kr−kt<kr0, kt>kw−dt0, and mf>mf0 are satisfied or not. In these conditional expressions, kr0 is a value of the exhaustion limit of the buffer 31. This value may be automatically set in accordance with a communication speed or may be arbitrarily set by a user. Moreover, dt0 is a set value of the trace time.

If it is determined that at least one of the conditional expressions is not satisfied, the process returns to a step S18 in FIG. 11. On the other hand, if it is determined that all the conditional expressions are satisfied, the process proceeds to a step S32. At the step S32, it is determined whether an image reproduction mode is set (pb=ture) or not and whether the trace time is equal to or lower than the limit value dt0 or not.

At a step S33, if it is determined that a desired carton is not yet written (that is, data to be read out is not yet recorded) or there is data being used or unused, the process returns to the step S18 in FIG. 11. On the other hand, if it is determined that the desired carton is not unwritten and there is no data being used or unused, the process proceeds to a step S34.

At the step S34, it is determined whether the data to be read out from the optical disc 1 is stored in the buffer 31 or not. If it is determined that the data is stored in the buffer 31, the following processes at steps S35 and S36 are skipped. If it is determined that the data is not stored in the buffer 31, the process proceeds to the step S35. At the step S35, data for one carton is read out. However, if f=0 is established, only the tag is read out. At the step S36, the counter mf is reset to 0. At a step S37, the register reg [k %10] is reset to kr (=K). The counter mf is reset to 0.

If the number of times repeating the steps S33 to S38 is smaller than cr0 at a step S38, the process returns to the step S33 so as to repeat the subsequent processes. If the number of times repeating the steps S33 to S38 reaches cr0, the process returns to the step S18 in FIG. 11.

At a step S18 in FIG. 11, the PCI interface 3 determines whether the data for one carton is stored in the buffer 31 or not. If it is determined that the data for one carton is not stored therein, the process returns to the step S13 so as to repeat the subsequent processes. If it is determined that the data for one carton is stored therein at the step S18, the process proceeds to a step S19 where the verification process is executed if there is any excessive time. Thereafter, the process returns to the step S12 so as to repeat the subsequent processes. The writing process, which corresponds to one of the processes for realizing the upload process, has been described above.

Figure 14:
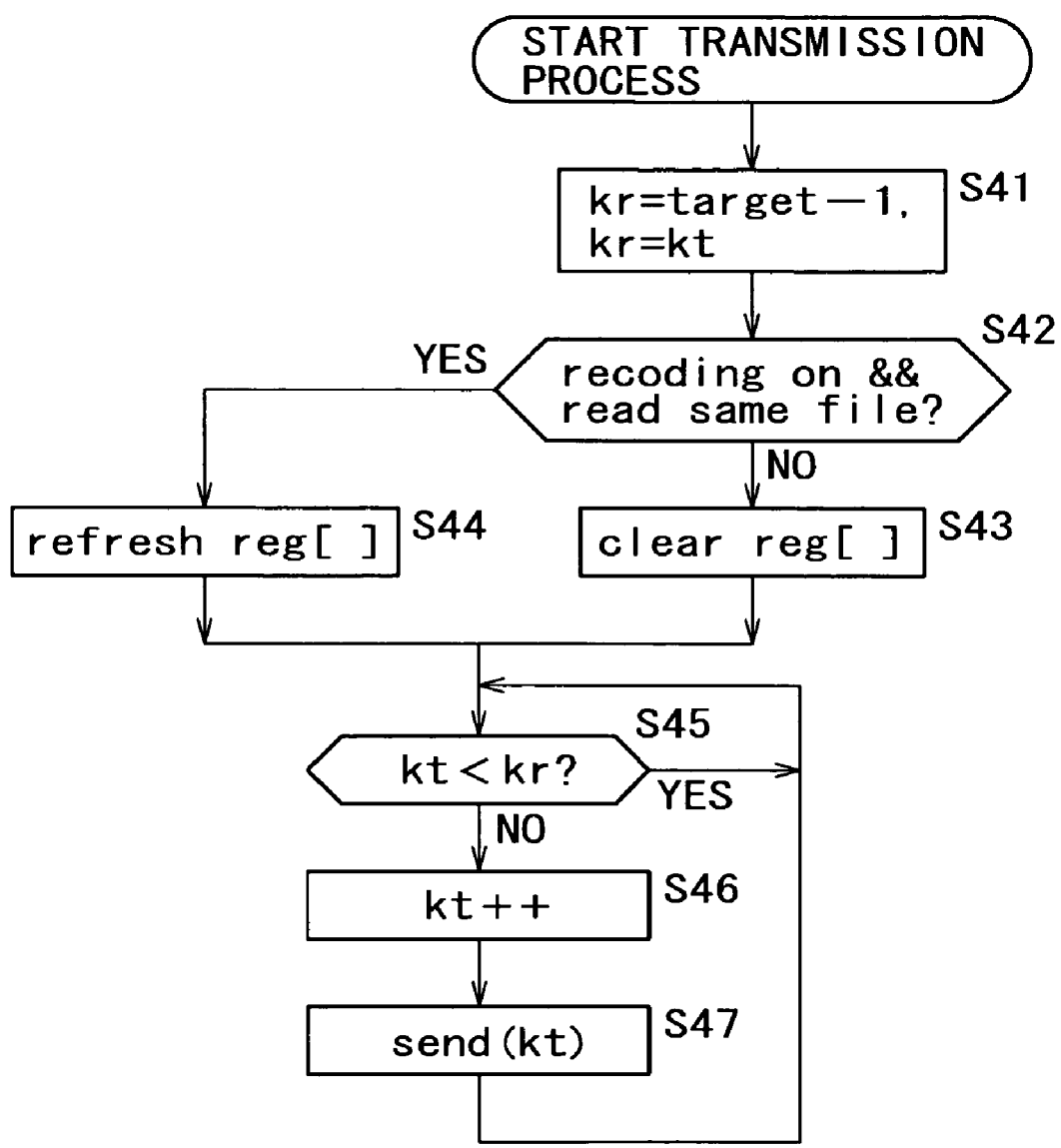
FIG. 14 is a flowchart for illustrating the transmission process for realizing the upload process in combination with the writing process.

The transmission process, which corresponds to the other one of the processes for realizing the upload process, will now be described with reference to a flowchart shown in FIG. 14. At a step S41, the PCI interface 3 sets kt indicating the carton number of the low resolution data being transmitted to target −1 while setting the last readout carton number kr to kt. At a step S42, the PCI interface 3 determines that two conditions, that is, data is being written and the same data is being read out, are satisfied or not. If it is determined that any one of the conditions is not satisfied, the process proceeds to a step S43 where the register reg [ ] is all cleared (an invalid value −1 is set). If it is determined that both of the conditions are satisfied, the process proceeds to a step S44 where the register reg [ ] is refreshed (if a value other than kt+1 to kt+10 is set, the set value is replaced by 0).

At a step S45, the PCI interface 3 waits until a conditional expression: kt<kr is satisfied. If it is determined that the conditional expression is satisfied, the process proceeds to a step S46. At the step S46, the PCI interface 3 increments kt by 1. At a step S47, the PCI interface 3 supplies the low resolution data having the current number of kt to the transmission section 18. The transmission section 18 transmits the supplied low resolution data having the current number of kt. Thereafter, the process returns to the step S45 so as to repeat the subsequent processes. The transmission process, which corresponds to the other one of the processes for realizing the upload process, has been described.

Next, a process in high-speed playback (so-called shuttle playback) of playing back data at a higher speed than a normal reproduction speed (single speed) will be described with reference to FIGS. 16 to 21.

Figure 16:
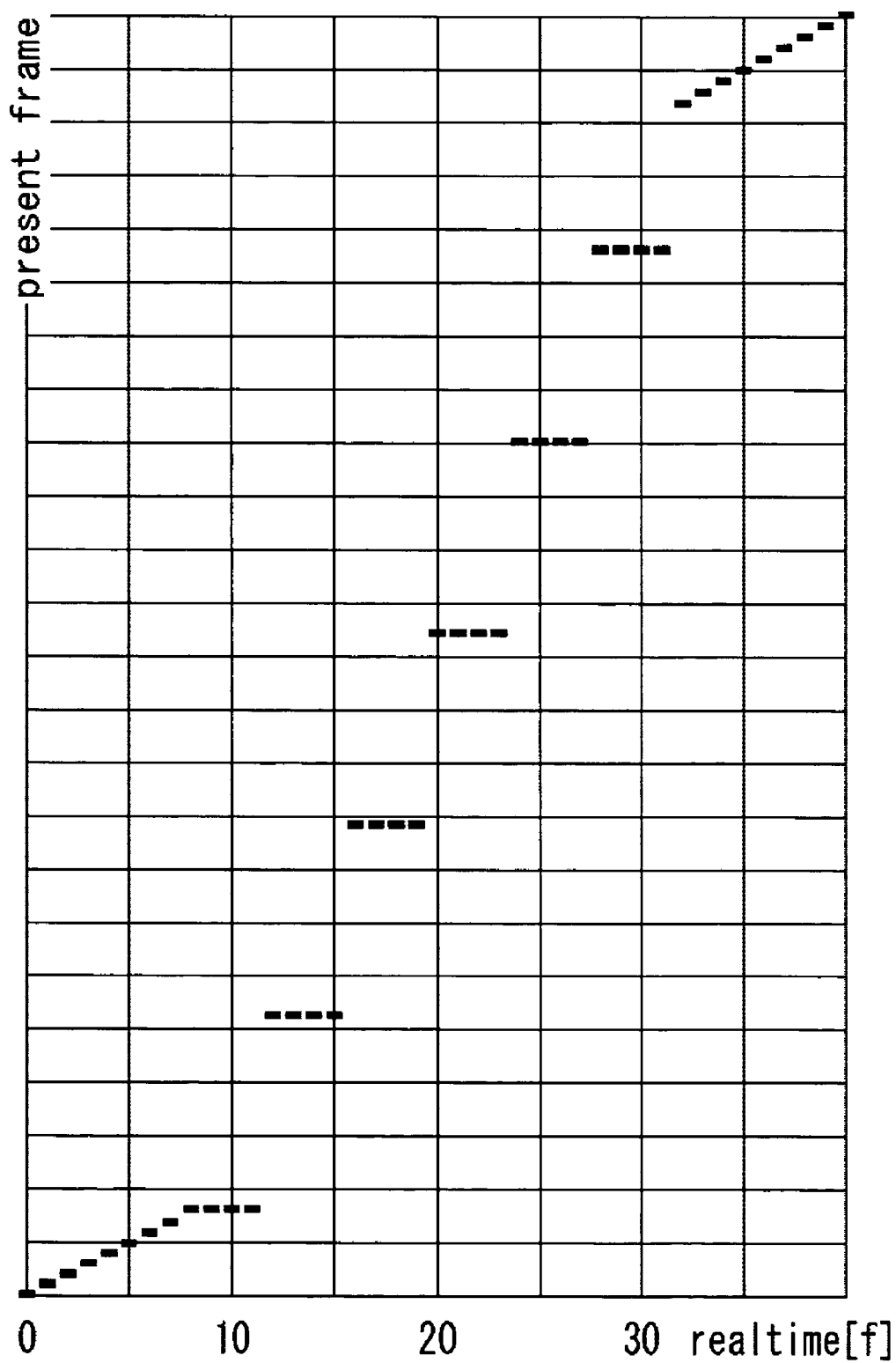

FIG. 16 shows high-speed playback performed by a conventional DVD player or the like. In the conventional case, it is common to instantaneously increase reproduction speed from single speed to display images while skipping some images in a similar way to show picture cards in the high-speed play back; that is, in the high-speed playback, a set of the number of images corresponding to the reproduction speed are extracted so as to be displayed as stationary images for each certain period of time.

On the other hand, in the disc recording/reproducing device according to this embodiment, the main track data is played back in normal playback, whereas the low resolution data is played back in high-speed playback. Instead of instantaneously changing the reproduction speed in the high-speed playback, the reproduction speed is gradually changed at a constant acceleration as shown in FIG. 17. The accelerated reproduction speed is calculated in a predetermined period. In a state where the reproduction speed is n-× speed, a screen is horizontally divided into n. The areas obtained by the division are made to partially display different frames of the low resolution data, respectively, so as to allow a user to intuitively know the current reproduction speed.

The high-speed playback will be more specifically described. If high-speed playback (for example, 8-× speed playback (8-× speed reproduction)) is directed in a state of normal playback where the main track data is displayed on a screen, the reproduction speed gradually changes from single speed to 8-× speed. When the reproduction speed reaches double speed, for example, the screen is horizontally divided in two. Two different frames of the low resolution data are partially displayed in the respective two areas obtained by the division. Similarly, for example, when the reproduction speed reaches triple speed, the screen is horizontally divided in three. Three different frames of the low resolution data are displayed partially in the respective three areas obtained by the division. When the reproduction speed ultimately reaches 8-× speed, the screen is horizontally divided into eight. Eight different frames of the low resolution data are partially displayed in the respective eight areas obtained by the division.

Figure 18:
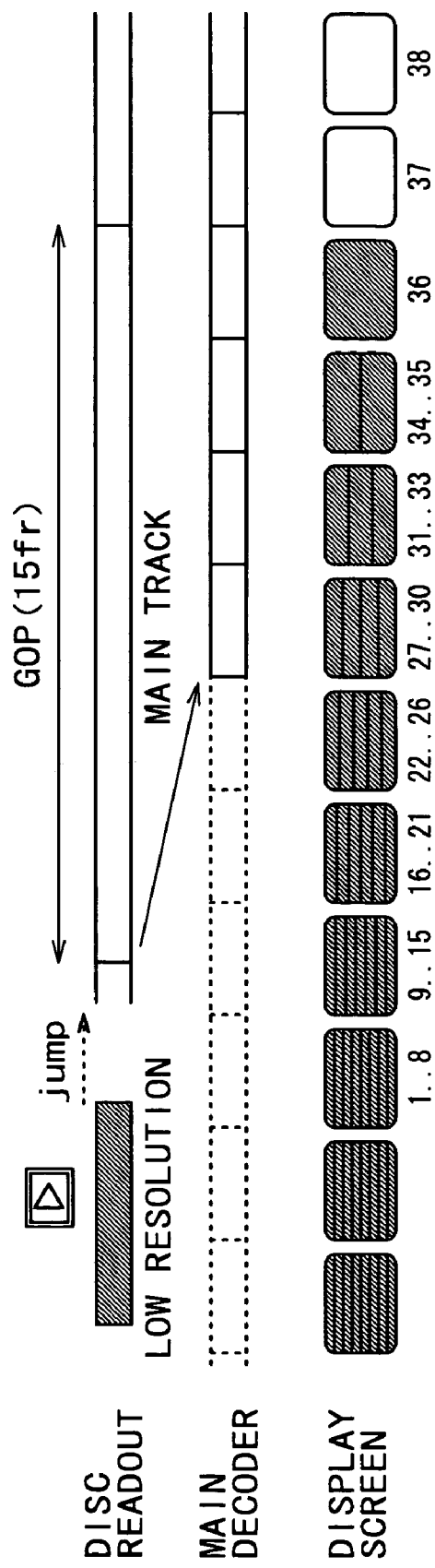
FIG. 18 is a diagram for schematically illustrating a process at the transition from high-speed playback to normal-speed playback.

If normal playback is directed by a user while the high-speed playback is in progress, the reproduction speed of the high-speed playback using the low resolution data is gradually lowered to single speed at a constant acceleration in the reverse manner to that described above, thereby switching the reproduction mode to single-speed playback of the main track data. For example, FIG. 18 shows a state where a reproduction mode returns from 8-× high-speed playback to normal playback.

In 8-× high-speed playback, the screen is horizontally divided into 8. Eight different frames of the low resolution data are partially displayed in the respective eight areas obtained by the division. If normal playback is directed by a user in this state, the reproduction speed is gradually lowered at a constant deceleration, corresponding to the acceleration, to 7-× speed, 6-× speed, 5-× speed, 4-× speed, triple speed, double speed and single speed. Meanwhile, for example, when the reproduction speed is lowered to 5-× speed, the screen is horizontally divided into 5. Five different five frames of the low resolution data are partially displayed in the respective areas obtained by the division. Similarly, when the reproduction speed is lowered to double speed, the screen is horizontally divided into two, two different frames of the low resolution data are partially displayed in the respective two areas obtained by the division.

In a case where the reproduction speed being accelerated is calculated in a predetermined period in the high-speed playback, the calculated reproduction speed being accelerated sometimes includes a decimal fraction, depending on the predetermined period or a value of the acceleration. In such a case, the division of the display screen will be more complicated. Such a case will be described with reference to FIG. 19.

Figure 19:
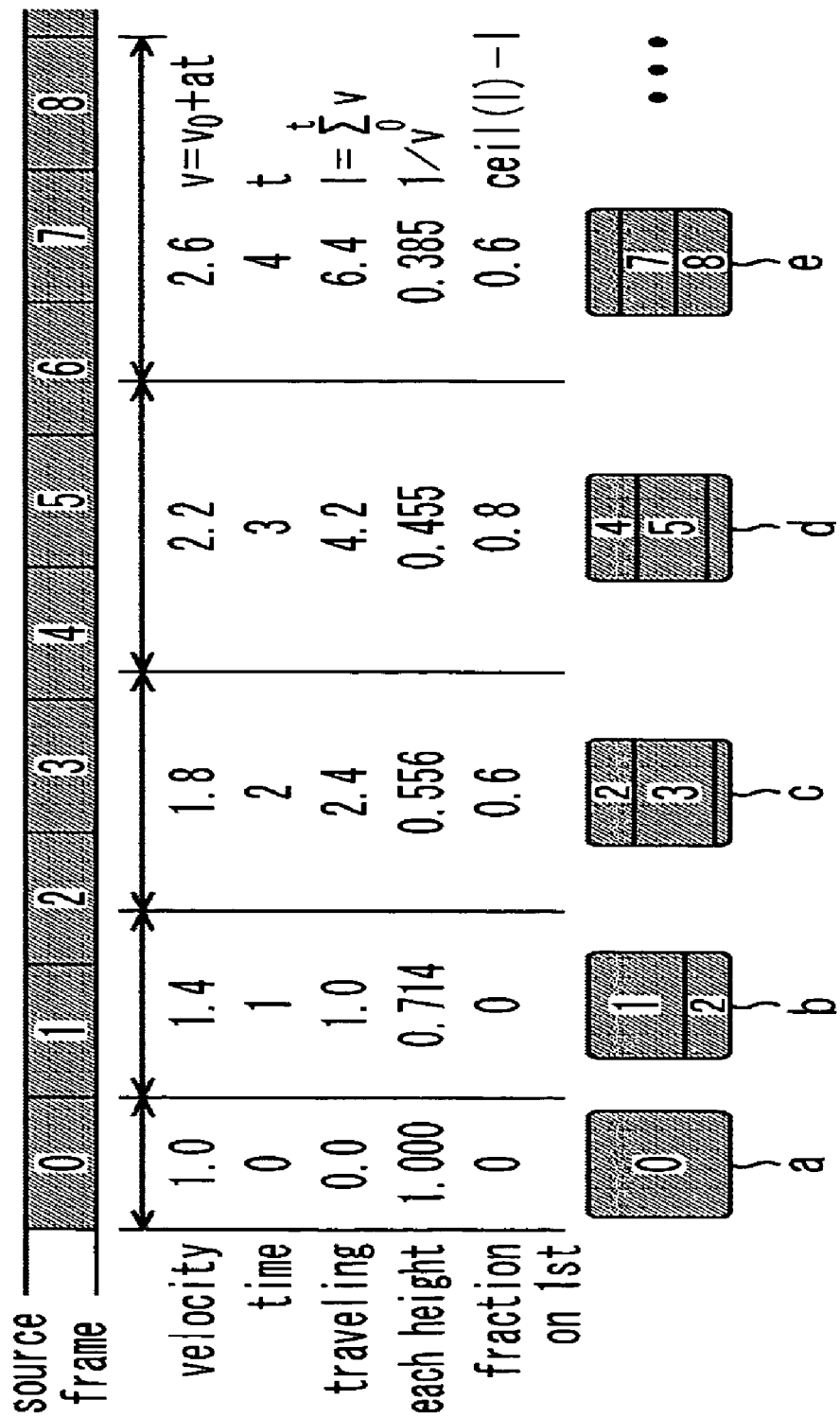
FIG. 19 is a diagram for schematically illustrating a horizontal division of a screen in high-speed playback.

For example, FIG. 19 shows an example where high-speed playback at 4-× speed is performed where a period for calculating the reproduction speed being accelerated is set to a time period allowing a frame to be switched in normal playback (in a case of NTSC, 1/30 seconds), a reproduction speed v is 1 at timing t=0, and an acceleration of the reproduction speed is 0.4 frames for each of the periods.

In this case, at the timing t=0, 1, 2, 3, . . . , 8, the reproduction speed v is calculated as 1, 1.4, 1.8, 2.2, . . . , 4.2.

At the timing t=0, the 0th frame is displayed on the screen.

At the timing t=1, a part of the first frame is displayed in an area having a height of 0.714 (=1/1.4) obtained by division, where the total height of the screen is 1. In an area therebelow, a part of the second frame is displayed.

At the timing t=2, a part of the third frame is displayed in an area having a height of 0.556 (=1/1.8) obtained by division, where the total height of the screen is 1. A part of the second frame is displayed in an area thereabove having a height obtained by: 0.6× the height 0.556, where 0.6 corresponds to a fraction of the moving distance l=2.4 with respect to 3, whereas a part of the fourth frame is displayed in an area therebelow.

At the timing t=3, a part of the fifth frame is displayed in an area having a height of 0.455 (=1/2.2) obtained by division, where the total height of the screen is 1. A part of the fourth frame is displayed in an area thereabove having a height obtained by 0.8× the height 0.455, where 0.8 corresponds to a fraction of the moving distance l=4.2 with respect to 5, whereas a part of the sixth frame is displayed in an area therebelow.

At the timing t=4, a part of the seventh frame is displayed in an area having a height of 0.385 (=1/2.6) obtained by division, where the total height of the screen is 1. A part of the sixth frame is displayed in an area thereabove having a height obtained by 0.6× the height 0.385, where 0.6 corresponds to a fraction of the moving distance l=6.4 with respect to 7, whereas a part of the eighth frame is displayed in an area therebelow.

For the following timings, the screen display is performed in a similar manner in accordance with the reproduction speed being accelerated.

Figure 20:
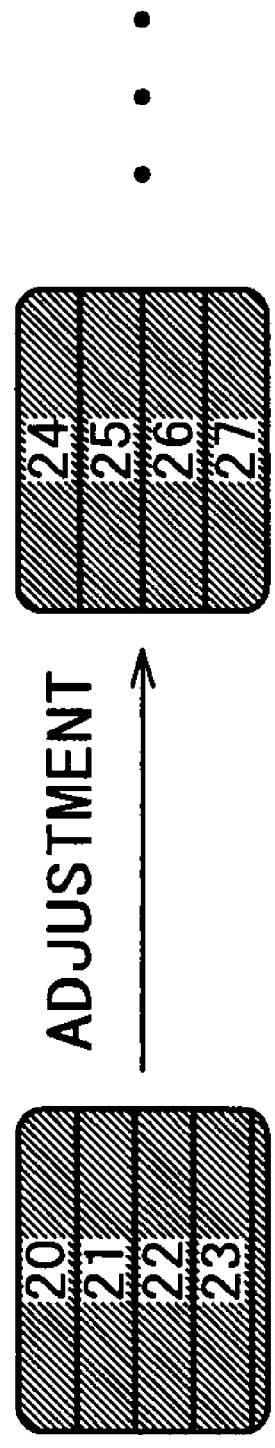
FIG. 20 is a diagram showing an example of adjustment of the division of the screen when the reproduction speed reaches a target reproduction speed in high-speed playback.

At the timing t=8, the reproduction speed reaches a target speed. At this time, an odd display area is generated by the division of the screen as shown in FIG. 20 on the left. If the high-speed playback is continued while such an odd display area is being present, the appearance is degraded. In addition, the process for display becomes troublesome. Therefore, as shown on the right in FIG. 20, the division of the screen is adjusted so as not to generate any odd areas, in the illustrated case, the screen is horizontally divided into four for display.

Figure 21:
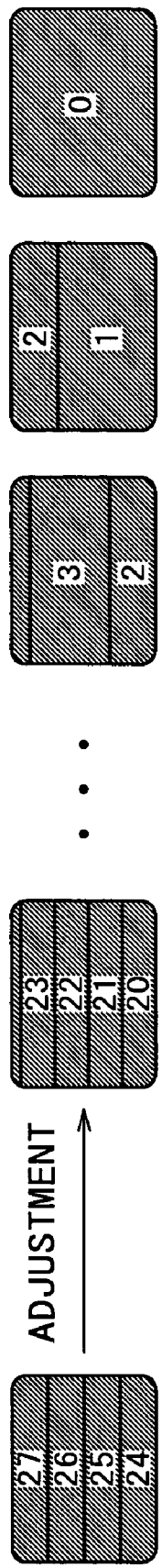
FIG. 21 is a diagram showing an example of adjustment of the division of the screen when a reproduction mode returns from high-speed playback to normal-speed playback.

On the contrary, in a case where the reproduction speed is lowered to single speed, for example, in response to a direction of normal playback by a user, from a state where the division of the screen is adjusted so as not to generate any odd areas as shown on the right in FIG. 20, the adjustment is cancelled at the start of deceleration, as shown in FIG. 21. In this manner, the appearance can be prevented from being degraded as compared with a case where the adjustment is not cancelled at the start of deceleration but the adjustment is performed again for an odd area, which is generated by the division of the screen when the reproduction speed returns to single speed.

Figure 22:
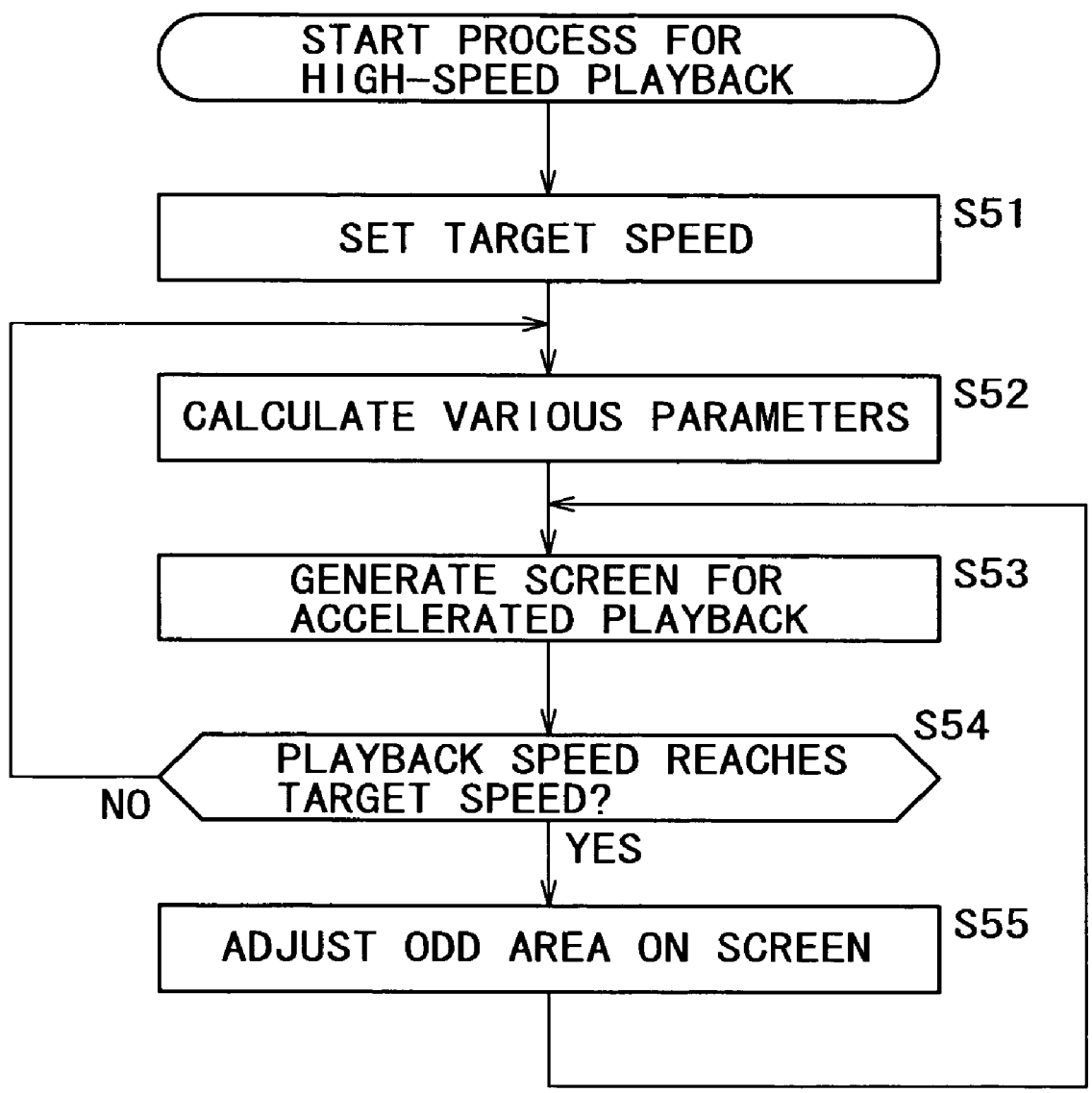
FIG. 22 is a flowchart for illustrating a high-speed playback process.

The above-described procedure of the high-speed playback is summarized as shown in a flowchart of FIG. 22. At a step S51, the system controller 10 sets a target speed (for example, 4-× speed) in the high-speed playback in response to the manipulation of the remote commander 21 by a user. Then, the system controller 10 starts counting time after initializing the timing t shown in FIG. 19 to 0 while initializing various parameters v, l and the like.

At a step S52, the system controller 10 calculates various parameters (a reproduction speed v, a moving distance 1, a height of an area obtained by horizontally dividing a screen, and the like) corresponding to the timing t. The system controller 10 outputs the height of the area obtained by horizontally dividing the screen to the OSD section 8 so as to direct the generation of the screen for the high-speed playback. At a step S53, in response to the direction from the system controller 10, the OSD section 8 generates video data whose different frames are partially displayed in the areas obtained by horizontally dividing the screen in accordance with the reproduction speed, and then outputs the video data to the later stage.

At a step S54, the system controller 10 determines whether the reproduction speed v calculated in the process at the step S52 has reached the target speed set in the process at the step S51 or not. If it is determined that the calculated reproduction speed v has not reached the target speed, the process returns to the step S51 so as to repeat the subsequent processes.

Then, at the step S54, if it is determined that the reproduction speed v calculated in the process at the step S52 has reached the target speed set in the process at the step S51, the process proceeds to a step S55. At the step S55, in response to the direction from the system controller 10, the OSD section 8 adjusts an odd area present in the video data generated by the process at the step S53 so as to output the video data to the later stage.

Thereafter, the process returns to the step S53 so as to repeat the subsequent processes until the termination of the high-speed playback is directed. The high-speed playback process has been described above.

Although the reproduction of video data has been described in the above embodiment, the present invention is also applicable to, for example, reproduction of audio data.

Although the low resolution data obtained by degrading the resolution of the main track data is used as the low resolution data in the above embodiment, it is also possible to use low resolution data obtained by, for example, reducing the number of bits allocated to pixels constituting the main track data as the low resolution data.

Furthermore, although the JPEG system is used as the encoding method for the low resolution data in the above embodiment, the encoding method used for the low resolution data is not limited to the JPEG method.

Although the MPEG system is used as the encode method for the main track data in the above embodiment, the encoding method for the main track data is not limited to the MPEG system.

Although the encoded video data are used for both the low resolution data and the main track data in the above embodiment, the video data without being encoded can be used as the low resolution data and the main track data.

Although the length of the carton is set to about 2 seconds in the above embodiment, the length of the carton is not limited thereto. For example, by reducing the length of the carton, a track jump from the low resolution data to the main track data can be reduced or omitted so as to further improve the response. On the other hand, by increasing the length of the carton, it becomes easy to read out the low resolution data in advance for storage. In this case, since it is not necessary to read out the low resolution data at each start of reproduction, the response can be further improved.

A series of the above-described processes may be executed either by a hardware or by a software. In a case where the series of the processes are executed by a software, the software is installed from a recording medium to a computer, in which a program constituting the software is incorporated into a dedicated hardware, or, for example, to a general-propose personal computer capable of executing various functions by installation of various programs.

Throughout the specification, the steps describing the program recorded on a recording medium include not only the processes performed in time series in accordance with the described order but also the processes executed in parallel or individually without being necessarily processed in time series.

Throughout the specification, the system means the entire device configured with a plurality of devices.

What is claimed is:

1. A recording device for recording first encoded data at a high bit rate and second encoded data at a lower bit rate than that of said first encoded data, both encoded data corresponding to the same material data, on an information recording medium, comprising:

first generation means for encoding said material data input thereto so as to generate said first encoded data;

second generation means for encoding said material data input thereto so as to generate said second encoded data;

recording means for recording said first encoded data generated by said first generation means and said second encoded data generated by said second generation means on said information recording medium in an alternate manner in terms of time; and readout means for reading out said second encoded data recorded on said information recording medium while said recording means is recording any one of said first and second encoded data;

storage means for storing said second encoded data recorded on said information recording medium by said recording means; and comparison means for comparing said second encoded means read out by said readout means with said stored second encoded data.

2. The recording device according to claim 1, wherein said recording means rewrites said encoded data stored by said storage means on said information recording medium in accordance with a result of comparison by said comparison means.

3. The recording device according to claim 2, wherein said recording means rewrites said encoded data stored by said storage means in a separate unrecorded area on said information recording medium if a plurality of successive results of comparison by said comparison means show that said data are not identical.

4. A recording method for recording first encoded data at a high bit rate and second encoded data at a lower bit rate than that of said first encoded data, both encoded data corresponding to a same material data, on an information recording medium, comprising:

a first generation step of encoding said material data input thereto so as to generate said first encoded data;

a second generation step of encoding said material data input thereto so as to generate said second encoded data;

a recording step of recording said first encoded data generated in said first generation step and said second encoded data generated in said second generation step on said information recording medium in an alternate manner in terms of time; and a readout step of reading out said second encoded data recorded on said information recording medium while any one of said first and second encoded data is being recorded in said recording step storage means for storing said second encoded data recorded on said information recording medium by said recording means; and comparison means for comparing said second encoded means read out by said readout means with said stored second encoded data.

5. A recording medium on which a program readable by a computer is recorded, said program being for recording first encoded data at a high bit rate and second encoded data at a lower bit rate than that of said first encoded data, both encoded data corresponding to a same material data, on an information recording medium, said program comprising:

a first generation step of encoding said material data input thereto so as to generate said first encoded data;

a second generation step of encoding said material data input thereto so as to generate said second encoded data;

a recording step of recording said first encoded data generated in said first generation step and said second encoded data generated in said second generation step on said information recording medium in an alternate manner in terms of time; and a readout step of reading out said second encoded data recorded on said information recording medium while any one of said first and second encoded data is being recorded by the process at said recording step storage means for storing said second encoded data recorded on said information recording medium by said recording means; and comparison means for comparing said second encoded means read out by said readout means with said stored second encoded data.

6. A recording medium on which a program readable by a computer is recorded, tangibly embodying computer-executable instructions, the instructions comprising:

a first generation step of encoding a material data input thereto so as to generate said first encoded data having a high bit-rate;

a second generation step of encoding said material data input thereto so as to generate said second encoded data having a low-bit rate, both the first and the second encoded data corresponding to a same material data, on said information recording medium;

a recording step of recording said first encoded data generated in said first generation step and said second encoded data generated in said second generation step on said information recording medium in an alternate manner in terms of time; and a readout step of reading out said second encoded data recorded on said information recording medium while any one of said first and second encoded data is being recorded in said recording step storage means for storing said second encoded data recorded on said information recording medium by said recording means; and comparison means for comparing said second encoded means read out by said readout means with said stored second encoded data.

7. A recording device for recording first encoded data at a high bit rate and second encoded data at a lower bit rate than that of said first encoded data, both encoded data corresponding to the same content data, on an information recording medium, comprising:

a first encoder that encodes the content data input to generate the first encoded data;

a second encoder for encoding the content data to generate the second encoded data;

a recorder for recording the first encoded data and the second encoded data on the information recording medium, wherein the recorder alternating writes the first encoded data and the second encoded data; and a readout unit for reading out the second encoded data recorded on the information recording medium while the recorder records either the first or second encoded data storage means for storing said second encoded data recorded on said information recording medium by said recording means; and comparison means for comparing said second encoded means read out by said readout means with said stored second encoded data.

8. The recording device according to claim 7, wherein said recorder records the first and second encoded data on the information recording medium in a CLV (Constant Linear Velocity) method.

9. The recording device according to claim 7, further comprising a decode for reproducing and playing back the second encoded data read out by the reading unit.

10. The recording device according to claim 7, wherein the second encoded data for a given portion of content data is always written before the first encoded data for the given content portion.

11. The recording device according to claim 7, further comprising:

an interface for transferring encoded content data between the first encoder, the second encoder and the recorder, and for verifying the fidelity of the data on the information recording medium.

12. The recording device according to claim 11, wherein the interface comprises:

a buffer for temporarily storing the second encoded data as verification data; and a comparison unit for comparing the verification data with the second encoded data from the readout unit;

wherein when the comparison unit determines that the verification data and the second encoded data from the readout unit is not identical, the interface causes the recorder to record in second encoded data on the information data medium again.

13. The recording device according to claim 12, wherein the recorder includes at least one pickup for reading and writing encoded data to the information recording medium;

when the comparison unit determines that the verification data and the second encoded data from the readout unit are not identical a predetermined number of times, the interface causes the recorder to move the location of the pickup in a radial direction.

14. The recording device according to claim 13, wherein the second encoded data for a given portion of content data is always written and verified before the first encoded data for the given content portion is written to the information recording medium.

15. The recording device according to claim 7, further comprising:

a transmission unit; and an interface for transferring encoded content data between the first encoder, the second encoder, the recorder, and the transmission unit; wherein the interface includes a buffer containing a portion of the second encoded data; and when data for a transmission is located in the buffer, the portion of the second encoded data in the buffer is transferred to the transmitter and when data for a transmission is not located in the buffer, the data for transmission is read from the information recording medium by the readout unit.

16. The recording device according to claim 7, further comprising:

a first decoder for decoding content data encoded by the first encoder, to produce a first decoded data;

a second decoder for decoding content data encoded by the second encoder, to produce a second decoded data; and an interface for transferring encoded content data between the first encoder, the second encoder, the first decoder, the second decoder, and the recorder.

17. The recording device according to claim 16, further comprising:

a resize section configured with poly-phase filters for increasing the resolution of the second decoded data from the second decoder to have the same resolution as the first decoded data, to produce a resized data.

18. The recording device according to claim 17, further comprising:

a switch that select between the first decoded data and the resized data for output to an on screen display (OSD) section, based on at least one of a ready flag from the first decoder and a controller.

* * * * *